United States Patent
Miyazaki et al.

(10) Patent No.: US 12,001,732 B2
(45) Date of Patent: Jun. 4, 2024

(54) OPERATION ANALYSIS SYSTEM, OPERATION ANALYSIS APPARATUS, OPERATION ANALYSIS METHOD, AND NON-TRANSITORY RECORDING MEDIUM

(71) Applicants: Ryonosuke Miyazaki, Tokyo (JP); Hiroki Yamamura, Tokyo (JP)

(72) Inventors: Ryonosuke Miyazaki, Tokyo (JP); Hiroki Yamamura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/219,715

(22) Filed: Jul. 10, 2023

(65) Prior Publication Data
US 2024/0036780 A1 Feb. 1, 2024

(30) Foreign Application Priority Data

Jul. 29, 2022 (JP) ................................. 2022-121278
Apr. 10, 2023 (JP) ................................. 2023-063710

(51) Int. Cl.
*G06F 3/12* (2006.01)

(52) U.S. Cl.
CPC .......... *G06F 3/1211* (2013.01); *G06F 3/1231* (2013.01)

(58) Field of Classification Search
CPC .............................. G06F 3/1211; G06F 3/1231
See application file for complete search history.

(56) References Cited

U.S. PATENT DOCUMENTS

| | | | |
|---|---|---|---|
| 11,748,045 B1* | 9/2023 | Morales | G06F 3/1211 |
| | | | 358/1.15 |
| 2001/0012411 A1 | 8/2001 | Miyazaki et al. | |
| 2002/0030853 A1 | 3/2002 | Kizaki et al. | |
| 2003/0030832 A1* | 2/2003 | Lea | G06K 15/00 |
| | | | 358/1.15 |
| 2005/0135829 A1 | 6/2005 | Miyazaki | |
| 2006/0250645 A1 | 11/2006 | Miyazaki | |
| 2009/0021758 A1 | 1/2009 | Miyazaki et al. | |
| 2010/0014104 A1* | 1/2010 | Soord | G06F 3/1253 |
| | | | 358/1.9 |
| 2013/0271791 A1 | 10/2013 | Miyazaki et al. | |
| 2014/0125659 A1 | 5/2014 | Yoshida et al. | |
| 2014/0126006 A1 | 5/2014 | Yoshida et al. | |

(Continued)

FOREIGN PATENT DOCUMENTS

| | | |
|---|---|---|
| JP | 2018-022464 | 2/2018 |
| JP | 2020-086953 | 6/2020 |
| JP | 2020-190839 | 11/2020 |

*Primary Examiner* — John R Wallace
(74) *Attorney, Agent, or Firm* — XSENSUS LLP

(57) ABSTRACT

An operation analysis system, an operation analysis apparatus, an operation analysis method, and a non-transitory recording medium. The operation analysis system acquires information related to printing from a printing device, calculates an operating rate of the printing device based on the information related to printing, determines whether the operating rate is equal to or lower than a first predetermined value, identifies a system configuration model for improving the operating rate of the printing device that has the operating rate equal to or lower than the first predetermined value based on a property of the printing device, and generates screen information of a presentation screen for presenting the system configuration model.

20 Claims, 28 Drawing Sheets

| DEVICE PROPERTY | OPERATOR CONDITION | PRINTING SERVICE | OFFERING MODEL |
|---|---|---|---|
| PHOTO-GRAPH | – | CATALOG PRINTING | SYSTEM CONFIGURATION A |
| PHOTO-GRAPH | COLOR RATE IS EQUAL TO OR HIGHER THAN PREDETERMINED VALUE | PHOTOBOOK | SYSTEM CONFIGURATION B |
| SPECIAL PAPER | – | BOOKLET PRINTING | SYSTEM CONFIGURATION C |
| SPECIAL COLOR | SPECIAL COLOR RATE IS EQUAL TO OR HIGHER THAN PREDETERMINED VALUE | BUSINESS CARD PRINTING | SYSTEM CONFIGURATION D |
| MIXED PAPER TYPE | – | WORK EFFICIENCY IMPROVEMENT WHEN PAPER TYPES ARE MIXED | SYSTEM CONFIGURATION E |
| SPECIAL COLOR | NUMBER OF PRINTING BY GOLD OR SILVER TONER IS EQUAL TO OR SMALLER THAN PREDETERMINED VALUE, AND NUMBER OF PRINTING BY SPECIAL COLOR TONER IS EQUAL TO OR LARGER THAN PREDETERMINED VALUE | ABC TONER | SYSTEM CONFIGURATION F |

(56) References Cited

U.S. PATENT DOCUMENTS

| | | |
|---|---|---|
| 2014/0333968 A1 | 11/2014 | Miyazaki et al. |
| 2014/0341601 A1 | 11/2014 | Miyazaki |
| 2015/0138570 A1 | 5/2015 | Tsutsui et al. |
| 2015/0227104 A1 | 8/2015 | Miyazaki |
| 2018/0024787 A1 | 1/2018 | Sakawaki et al. |
| 2020/0074598 A1 | 3/2020 | Yamamura et al. |
| 2020/0294207 A1 | 9/2020 | Yamamura et al. |
| 2021/0356892 A1 | 11/2021 | Yamamura |
| 2021/0356895 A1 | 11/2021 | Yamamura |
| 2022/0113663 A1 | 4/2022 | Yamamura |
| 2022/0137539 A1 | 5/2022 | Yamamura |

\* cited by examiner

FIG. 5

| USER ID | DEVICE ID | MODEL NAME |
|---------|-----------|------------|
| AAA | A01 | MODEL A |
| AAA | A02 | MODEL B |
| BBB | B01 | MODEL C |
| CCC | C01 | MODEL C |

FIG. 6

|  | PHOTOGRAPH | SPECIAL PAPER | SPECIAL COLOR |
|--|------------|---------------|---------------|
| MODEL A | YES | YES | NO |
| MODEL B | PARTLY | NO | YES |
| MODEL C | YES | NO | YES |

FIG. 7

| DEVICE PROPERTY | PRINT SERVICE | OFFERING MODEL |
|---|---|---|
| PHOTOGRAPH | CATALOG PRINTING | SYSTEM CONFIGURATION A |
| PHOTOGRAPH | PHOTOBOOK | SYSTEM CONFIGURATION B |
| SPECIAL PAPER | BOOKLET PRINTING | SYSTEM CONFIGURATION C |
| SPECIAL COLOR | BUSINESS CARD PRINTING | SYSTEM CONFIGURATION D |
| MIXED PAPER TYPE | WORK EFFICIENCY IMPROVEMENT WHEN PAPER TYPES ARE MIXED | SYSTEM CONFIGURATION E |

FIG. 8

| DEVICE ID | DATE AND TIME | PRINTING TIME (HOURS) | STANDBY TIME (HOURS) | OPERATING RATE (%) |
|---|---|---|---|---|
| A01 | 4/1/2022 | 6.4 | 1.6 | 80 |
| | 4/2/2022 | 5.6 | 2.4 | 70 |
| A02 | 4/1/2022 | 4.0 | 4.0 | 50 |
| | 4/2/2022 | 1.6 | 6.4 | 20 |
| B01 | 4/1/2022 | 7.2 | 0.8 | 90 |
| | 4/2/2022 | 1.6 | 6.4 | 20 |

FIG. 16

| DEVICE ID | DATE AND TIME | PRINTING TIME (HOURS) | STANDBY TIME (HOURS) | OPERATING RATE (%) | JOB TYPE RATE | |
|---|---|---|---|---|---|---|
| | | | | | COLOR RATE (%) | SPECIAL COLOR RATE (%) |
| A01 | 4/1/2022 | 6.4 | 1.6 | 80 | 90 | 0 |
| A02 | 4/1/2022 | 4.0 | 4.0 | 50 | 90 | 0 |
| B01 | 4/1/2022 | 7.2 | 0.8 | 90 | 30 | 80 |

FIG. 17

| DEVICE PROPERTY | OPERATOR CONDITION | PRINTING SERVICE | OFFERING MODEL |
|---|---|---|---|
| PHOTOGRAPH | - | CATALOG PRINTING | SYSTEM CONFIGURATION A |
| PHOTOGRAPH | COLOR RATE EQUAL TO OR HIGHER THAN PREDETERMINED VALUE | PHOTOBOOK | SYSTEM CONFIGURATION B |
| SPECIAL PAPER | - | BOOKLET PRINTING | SYSTEM CONFIGURATION C |
| SPECIAL COLOR | SPECIAL COLOR RATE EQUAL TO OR HIGHER THAN PREDETERMINED VALUE | BUSINESS CARD PRINTING | SYSTEM CONFIGURATION D |
| MIXED PAPER TYPE | - | WORK EFFICIENCY IMPROVEMENT WHEN PAPER TYPES ARE MIXED | SYSTEM CONFIGURATION E |

FIG. 19

| DEVICE ID | DATE AND TIME | PRINTING TIME (HOURS) | STANDBY TIME (HOURS) | OPERATING RATE (%) | NUMBER OF REPLACEMENTS OF REPLACEMENT PART |
|---|---|---|---|---|---|
| A01 | 4/1/2022 | 6.4 | 1.6 | 80 | 10 |
| A02 | 4/1/2022 | 4.0 | 4.0 | 50 | 10 |
| B01 | 4/1/2022 | 7.2 | 0.8 | 90 | 30 |

| USER ID | DEVICE ID | MODEL | PROPOSAL CANDIDATE ID | PROPOSAL HISTORY ID |
|---|---|---|---|---|
| AAA | A01 | MODEL A | 1, 2, 3 | 1, 2, 3 |
| AAA | A02 | MODEL B | 4, 5 | 4, 5 |
| BBB | B01 | MODEL C | 6, 7 | 7 |
| CCC | C01 | MODEL C | 8, 9 | 9 |

FIG. 24

| PROPOSAL CANDIDATE ID | OFFERING MODEL | ADDED DATE AND TIME | REASON FOR IDENTIFICATION | USER REACTION | DETAILS OF REACTION | STATUS |
|---|---|---|---|---|---|---|
| 1 | SYSTEM CONFIGURATION F | 12/2/2022 9:00 | TONER OTHER THAN GOLD AND SILVER … | 5 | GOLD AND SILVER TONER IS RELEASED… | PROPOSING |
| 2 | SYSTEM CONFIGURATION G | 11/2/2022 9:05 | COLOR RATE IS… | – | – | BEFORE PROPOSAL |
| 3 | SYSTEM CONFIGURATION H | 11/2/2022 10:11 | SPECIAL PAPER RATE IS… | – | – | BEFORE PROPOSAL |

FIG. 25

| PROPOSAL HISTORY ID | OFFERING MODEL | ADDED DATE AND TIME | STATUS | STATUS UPDATED DATE AND TIME |
|---|---|---|---|---|
| 1 | SYSTEM CONFIGURATION F | 12/2/2022 9:00 | PROPOSED | 12/7/2022 17:01 |
| 4 | SYSTEM CONFIGURATION I | 12/4/2022 11:00 | ACCEPTED | 12/4/2022 15:32 |
| 5 | SYSTEM CONFIGURATION J | 12/5/2022 12:00 | REJECTED | 12/5/2022 17:22 |

FIG. 26

| DEVICE PROPERTY | OPERATOR CONDITION | PRINTING SERVICE | OFFERING MODEL |
|---|---|---|---|
| PHOTOGRAPH | – | CATALOG PRINTING | SYSTEM CONFIGURATION A |
| PHOTOGRAPH | COLOR RATE IS EQUAL TO OR HIGHER THAN PREDETERMINED VALUE | PHOTOBOOK | SYSTEM CONFIGURATION B |
| SPECIAL PAPER | – | BOOKLET PRINTING | SYSTEM CONFIGURATION C |
| SPECIAL COLOR | SPECIAL COLOR RATE IS EQUAL TO OR HIGHER THAN PREDETERMINED VALUE | BUSINESS CARD PRINTING | SYSTEM CONFIGURATION D |
| MIXED PAPER TYPE | – | WORK EFFICIENCY IMPROVEMENT WHEN PAPER TYPES ARE MIXED | SYSTEM CONFIGURATION E |
| SPECIAL COLOR | NUMBER OF PRINTING BY GOLD OR SILVER TONER IS EQUAL TO OR SMALLER THAN PREDETERMINED VALUE, AND NUMBER OF PRINTING BY SPECIAL COLOR TONER IS EQUAL TO OR LARGER THAN PREDETERMINED VALUE | ABC TONER | SYSTEM CONFIGURATION F |

FIG. 27

| DEVICE ID | DATE AND TIME | PRINTING TIME (HOURS) | STANDBY TIME (HOURS) | OPERATING RATE (%) | COLOR | MONO-CHROME | SPECIAL COLOR (CLEAR) | SPECIAL COLOR (WHITE) | SPECIAL COLOR (GOLD) | SPECIAL COLOR (SILVER) |
|---|---|---|---|---|---|---|---|---|---|---|
| A01 | 4/1/2022 | 4.0 | 4.0 | 50 | 1000 | 2000 | 500 | 100 | 10 | 10 |
| A02 | 4/1/2022 | 6.4 | 1.6 | 80 | 2000 | 1000 | 0 | 0 | 500 | 100 |
| B01 | 4/1/2022 | 7.2 | 0.8 | 90 | 3000 | 3000 | 0 | 500 | 0 | 0 |

FIG. 32

| Proposed Solution | ABC Toner | Proposal Result Report (User: DEF Company) | Updated Date and Time: 12/1/2022 9:05 |
|---|---|---|---|
| Proposed Data | | 12/7/2022 | |
| User Reaction | | Good 5● 4○ 3○ 2○ Bad 1○ | |
| Details | | User did not know that ABC toner is released. User is interested to see some print samples. Revisit is scheduled. | |
| Result | | Accepted○ Proposed● Rejected○ | |

Send (1445)  Save (1446)  Back (1447)

OPERATION ANALYSIS SYSTEM, OPERATION ANALYSIS APPARATUS, OPERATION ANALYSIS METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2022-121278, filed on Jul. 29, 2022, and No. 2023-063710 filed on Apr. 10, 2023, in the Japan Patent Office, the entire disclosure of which is hereby incorporated by reference herein.

BACKGROUND

Technical Field

The present disclosure relates to an operation analysis system, an operation analysis apparatus, an operation analysis method, and a non-transitory recording medium.

Related Art

A known system proposes a recommended product such as an application to be additionally purchased by a user based on a usage status of a printing device owned by the user.

For example, a disclosed technique acquires information on a device owned by a user, and presents the user with recommended products such as applications to be used in the device based on the acquired device information. In another example, operation information of the device owned by the user is acquired, and recommended products such as applications and services are presented based on the number of devices that are actually in operation among the devices owned by the user. In another example, a configuration has been disclosed in which the usage statuses of printing devices are obtained, and a printing device that reliably outputs can be selected for output from among the printing devices.

SUMMARY

Embodiments of the present disclosure describe an operation analysis system, an operation analysis apparatus, an operation analysis method, and a non-transitory recording medium. The operation analysis system acquires information related to printing from a printing device, calculates an operating rate of the printing device based on the information related to printing, determines whether the operating rate is equal to or lower than a first predetermined value, identifies a system configuration model for improving the operating rate of the printing device that has the operating rate equal to or lower than the first predetermined value based on a property of the printing device, and generates screen information of a presentation screen for presenting the system configuration model.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 5 is a table illustrating an example of owned device information;

FIG. 6 is a table illustrating an example of property information of a printing device;

FIG. 7 is a table illustrating an example of offering model management information;

FIG. 8 is a table illustrating an example of operating rate information of the printing device;

FIG. 16 is a table illustrating an example of the operating rate information of the printing device;

FIG. 17 is a table illustrating an example of offering model management information;

FIG. 19 is a table illustrating an example of the operating rate information of the printing device;

FIG. 24 is a table illustrating an example of proposal candidate information;

FIG. 25 is a table illustrating an example of proposal history information;

FIG. 26 is a table illustrating an example of offering model management information;

FIG. 27 is a table illustrating an example of the operating rate information of the printing device;

FIG. 32 is a diagram illustrating an example of a proposal result report screen;

Figure 1:
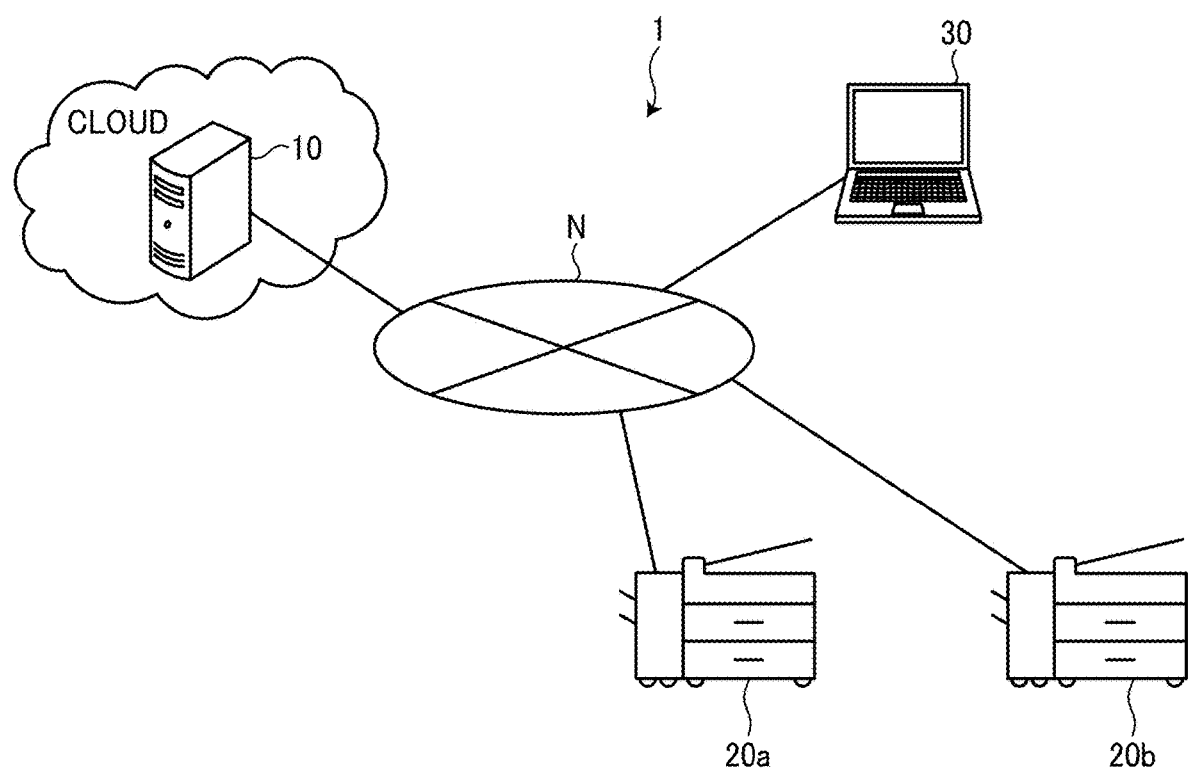
FIG. 1 is a diagram illustrating an example of an overall configuration of an information processing system according to a first embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

An operation analysis system, an operation analysis apparatus, an operation analysis method, and a non-transitory recording medium according to embodiments of the present disclosure are described below in detail with reference to the accompanying drawings. The present disclosure, however, is not limited to the following embodiments, and the constituent elements of the following embodiments include elements that can be easily conceived by those skilled in the art, those being substantially the same ones, and those being equivalent. Furthermore, various omissions, substitutions, changes, and combinations of the constituent elements can be made without departing from gist of the following embodiments.

Computer software refers to programs related to computer operations and other information used for processing by computers that are equivalent to programs (hereinafter, computer software is referred to as software). An application program, which may be simply referred to as "application," is a general term for any software used to perform certain processing. An operating system (hereinafter simply referred to as an "OS") is software for controlling a computer, such that software, such as application, is able to use computer resource. The OS controls basic operation of the computer such as input or output of data, management of hardware such as a memory or a hard disk, or processing to be executed.

The application software operates by utilizing functions provided by the OS. The program is a set of instructions for causing the computer to perform processing to have a certain result. While data to be used in processing according to the program is not a program itself, such data may define processing to be performed by the program such that the data to be used in processing may be interpreted as equivalent to the program. For example, a data structure, which is a logical structure of data described by an interrelation between data elements, may be interpreted as equivalent to the program.

FIG. 1 is a diagram illustrating an example of an overall configuration of an information processing system according to a first embodiment. The overall configuration of the information processing system 1 according to the present embodiment is described with reference to FIG. 1.

The information processing system 1 illustrated in FIG. 1 is a system, which analyzes operation statuses of printing devices owned by users such as companies and presents a system configuration that improves an operating rate of a printing device as an offering model. As illustrated in FIG. 1, the information processing system 1 includes an operation analysis system 10, printing devices 20a and 20b, and a client personal computer (PC) 30 (an example of a management apparatus). The systems and devices described above communicate with each other through a network N. The network N is, for example, the internet, and may include either a wired network or a wireless network.

The operation analysis system 10 is a web-based system residing on the cloud, which analyzes the operation statuses of printing devices owned by users such as companies and presents a system configuration that improves the operating rate of the printing device as the offering model. The operation analysis system 10 may be implemented by a single information processing apparatus or a plurality of information processing apparatuses.

The printing devices 20a and 20b are printing devices owned by users of particular companies or the like. The printing devices 20a and 20b may be printing devices used for commercial printing or industrial printing, or may be printing devices used as office devices. In the present embodiment, the printing devices 20a and 20b are described as multifunction peripherals (MFPs), but the printing devices 20a and 20b may be commercial printing devices controlled by a digital front end (DFE) or the like. The commercial printing devices include commercial printing devices and industrial printing devices, and are printing devices installed in a printing factory of a printing company or an article production factory. The commercial printing devices are high-quality, high-production printing devices for printing print materials such as posters, booklets, advertisements, and direct mails. The industrial printing devices print images on various media other than paper, such as plastic product packages, fabrics such as T-shirts, ceramics, metals, and the like. In order to improve profits of the owners, these commercial printing devices are preferred to improve the operating rates. In the example illustrated in FIG. 1, two printing devices 20a and 20b are illustrated, but the number of printing devices 20a and 20b is not limited to this example. Further, the printing devices 20a and 20b are simply referred to as "printing devices 20" when indicating any one or more of the printing devices or when collectively referring to the printing devices. The printing devices 20a and 20b are illustrated as printing devices owned by a specific user, but each printing device may be owned by a different user and may be connected to the network N so as to be able to communicate with the operation analysis system 10.

A client PC 30 is, for example, an information processing apparatus such as the PC owned by the user who owns the printing devices 20a and 20b, a smart phone, or a tablet terminal. Note that the client PC 30 is not limited to being an information processing apparatus owned by the user, and may be an information processing apparatus owned by a salesperson or the like who sells the printing device 20 and presents the above-described offering model.

Figure 2:
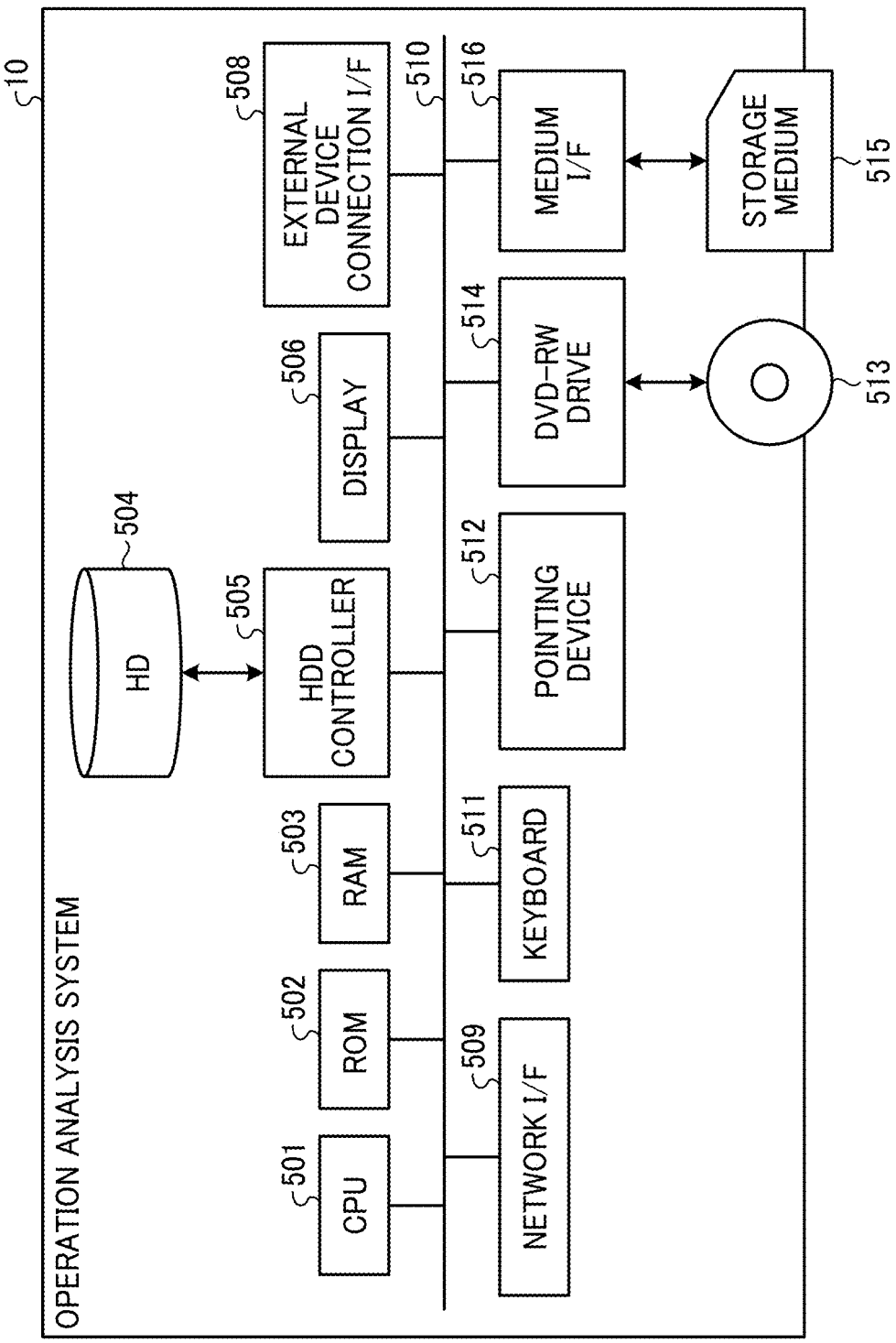
FIG. 2 is a block diagram illustrating an example of a hardware configuration of an operation analysis system according to the first embodiment.

FIG. 2 is a block diagram illustrating an example of a hardware configuration of the operation analysis system according to the first embodiment of the present disclosure. The hardware configuration of the operation analysis system 10 according to the present embodiment is described with reference to FIG. 2.

As illustrated in FIG. 2, the operation analysis system 10 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a keyboard 511, a pointing device 512, a digital versatile disc-rewritable (DVD-RW) drive 514, and a medium I/F 516. These devices are connected by a bus line 510 such as an address bus and a data bus so as to enable data communication.

The CPU 501 is a processor that controls an entire operation of the operation analysis system 10. The ROM 502 is a non-volatile storage device that stores programs used to drive the CPU 501, such as an initial program loader (IPL). The RAM 503 is a volatile storage device used as a work area for the CPU 501.

The HD 504 is a non-volatile auxiliary storage device that stores various data such as the programs.

The HDD controller 505 is a controller that controls reading or writing of various data to and from the HD 504 under the control of the CPU 501. Note that the HD 504 and HDD controller 505 may be solid status drives (SSDs) or the like.

The display 506 is a display device that displays various types of information such as cursors, menus, windows, characters, and images. The external device connection I/F 508 is an interface for connecting various external devices. The external device in this case includes, for example, a Universal Serial Bus (USB) memory. The network I/F 509 is an interface for data communication through the network N, and is capable of communication conforming to, for example, ETHERNET (registered trademark) and Transmission Control Protocol/Internet Protocol (TCP/IP).

The keyboard 511 is an input device provided with a plurality of keys for inputting characters, numerical values, various instructions, and the like. The pointing device 512 is an input device such as a mouse for selecting and executing various instructions, selecting a processing target, moving a cursor, and the like.

The digital versatile disc-rewritable (DVD-RW) drive 514 is a device that controls reading and writing of various data from and to a Digital Versatile Disc (DVD) 513, such as a Digital Versatile Disc Recordable (DVD-R) or DVD-RW, which are examples of a removable recording medium. The medium I/F 516 is an interface that controls reading or writing (storage) of data from and to a storage medium 515 such as a flash memory.

The hardware configuration of the operation analysis system 10 illustrated in FIG. 2 is an example, and may not include all the components illustrated in FIG. 2, or may include other components. The hardware configuration of the client PC 30 also conforms to the hardware configuration illustrated in FIG. 2. The operation analysis system 10 and the client PC 30 may not have the same hardware configuration.

Figure 3:
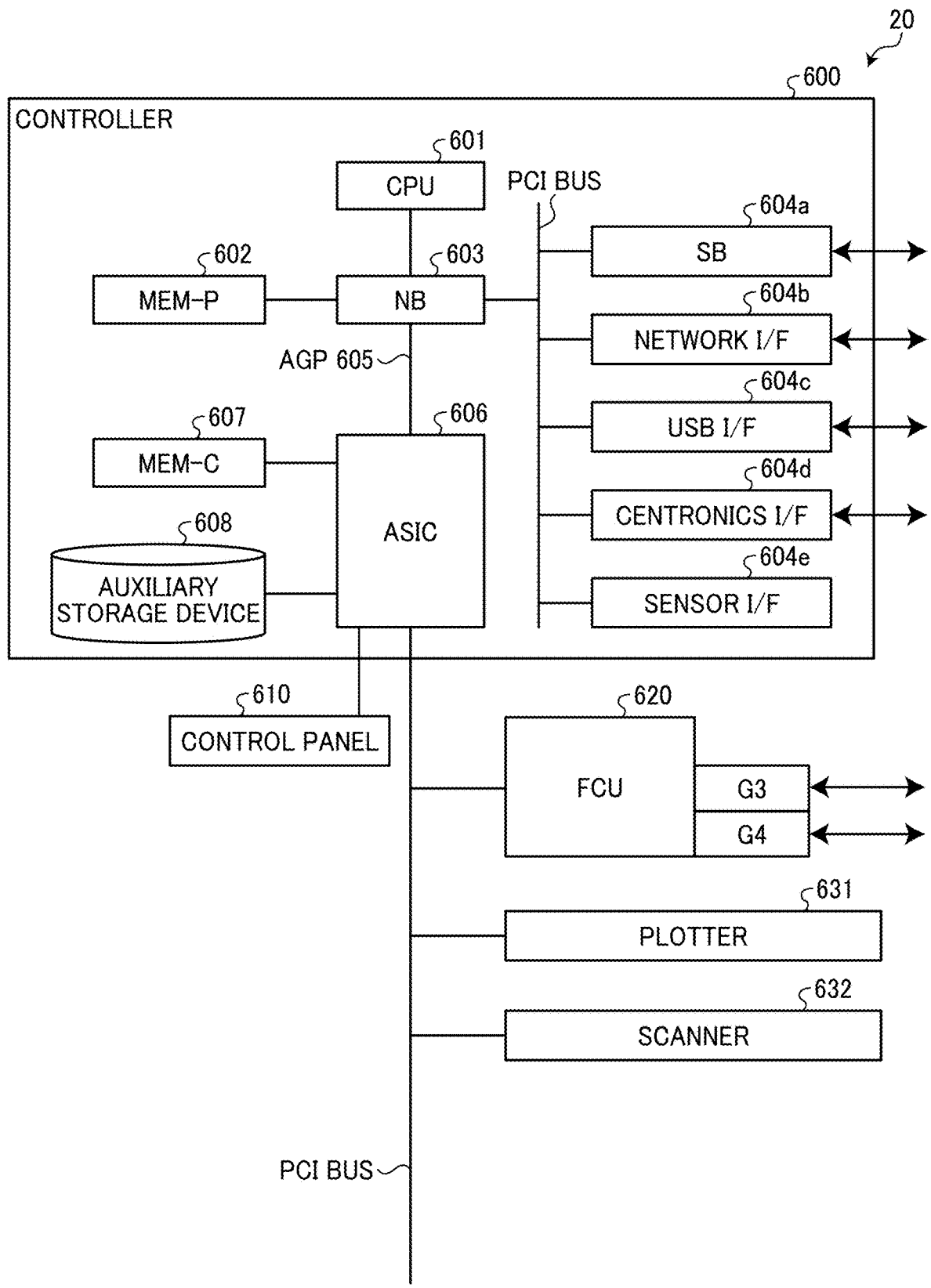
FIG. 3 is a block diagram illustrating an example of a hardware configuration of a printing device according to the first embodiment.

FIG. 3 is a block diagram illustrating an example of a hardware configuration of the printing device according to the first embodiment. The hardware configuration of the printing device 20 is described with reference to FIG. 3.

As illustrated in FIG. 3, the printing device 20 includes a controller 600, a control panel 610, a facsimile control unit (FCU) 620, a plotter 631, and a scanner 632, which are connected through a peripheral component interface (PCI) bus.

The controller 600 is a device that controls the overall control of the printing device 20, drawing, communication, and input from the control panel 610.

The control panel 610 is, for example, a touch panel or the like, and is a device that receives input to the controller 600 (input function) and displays a status of the printing device 20 (display function) and is connected to an application specific integrated circuit (ASIC) 606 described below.

The FCU 620 implements a facsimile function. The FCU 620 is connected to the application specific integrated circuit (ASIC) 606 by, for example, the PCI bus.

The plotter 631 implements a printing function and is connected to the ASIC 606 by, for example, the PCI bus. The scanner 632 implements a scanner function and is connected to the ASIC 606 by, for example, the PCI bus.

The controller 600 includes a CPU 601, a system memory (MEM-P) 602, a northbridge (NB) 603, a southbridge (SB) 604a, a network/F 604b, a USB/F 604c, a Centronics I/F 604d, a sensor I/F 604e, an ASIC 606, a local memory (MEM-C) 607, and an auxiliary storage device 608.

The CPU 601 is an arithmetic unit that performs overall control of the printing device 20, is connected to a chipset including a system memory (MEM-P) 602, a northbridge (NB) 603 and a southbridge 604a, and is connected to other devices through this chipset.

The system memory (MEM-P) 602 is a memory for storing programs and data, a memory for deploying programs and data, a memory for rendering of a printer, and the like, and includes a ROM and a RAM. The ROM is a read only memory used as a memory for storing programs and data, and the RAM is a memory for deploying programs and data, and a writable and readable memory used as a rendering memory for a printer and the like.

The NB 603 is a bridge for connecting the CPU 601 to the MEM-P 602, the SB 604a, and the accelerated graphics port (AGP) bus 605 and includes a memory controller that controls reading and writing to the MEM-P 602, a PCI master, and an AGP target.

The SB 604a connects the NB 603 with a PCI device and a peripheral device. The SB 604a is connected to the NB 603 through the PCI bus, and network I/F 604b, USB I/F 604c, Centronics I/F 604d, sensor I/F 604e, and the like are connected to the PCI bus.

The AGP bus 605 is a bus interface for a graphics accelerator card proposed for speeding up graphics processing. The AGP bus 605 directly accesses the MEM-P 602 with high throughput to accelerate the graphics accelerator card.

The ASIC 606 is an integrated circuit (IC) dedicated to an image processing use, and connects the AGP bus 605, the PCI bus, the auxiliary storage device 608, and the MEM-C 607. The ASIC 606 includes a PCI target, an AGP master, an arbiter (ARB) as a central processor of the ASIC 606, a memory controller for controlling the MEM-C 607, a plurality of direct memory access controllers (DMACs) that rotate image data using hardware logic, etc., and a PCI unit that transfers data between the scanner 632 and the plotter 631 through the PCI bus. The FCU 620, the plotter 631 and the scanner 632 are connected to the ASIC 606 through, for example, the PCI bus.

The MEM-C 607 is a memory used as a copy image buffer and a code buffer.

The auxiliary storage device 608 is a storage device such as an HDD, SSD, Secure Digital (SD) card, flash memory, or the like, and is a storage for storing image data, programs, font data, and forms.

The hardware configuration of the printing device 20 illustrated in FIG. 3 is an example and may not include all the components illustrated in FIG. 3 or may include other components. For example, the printing device 20 may be provided with an automatic document feeder (ADF) or the like.

Figure 4:
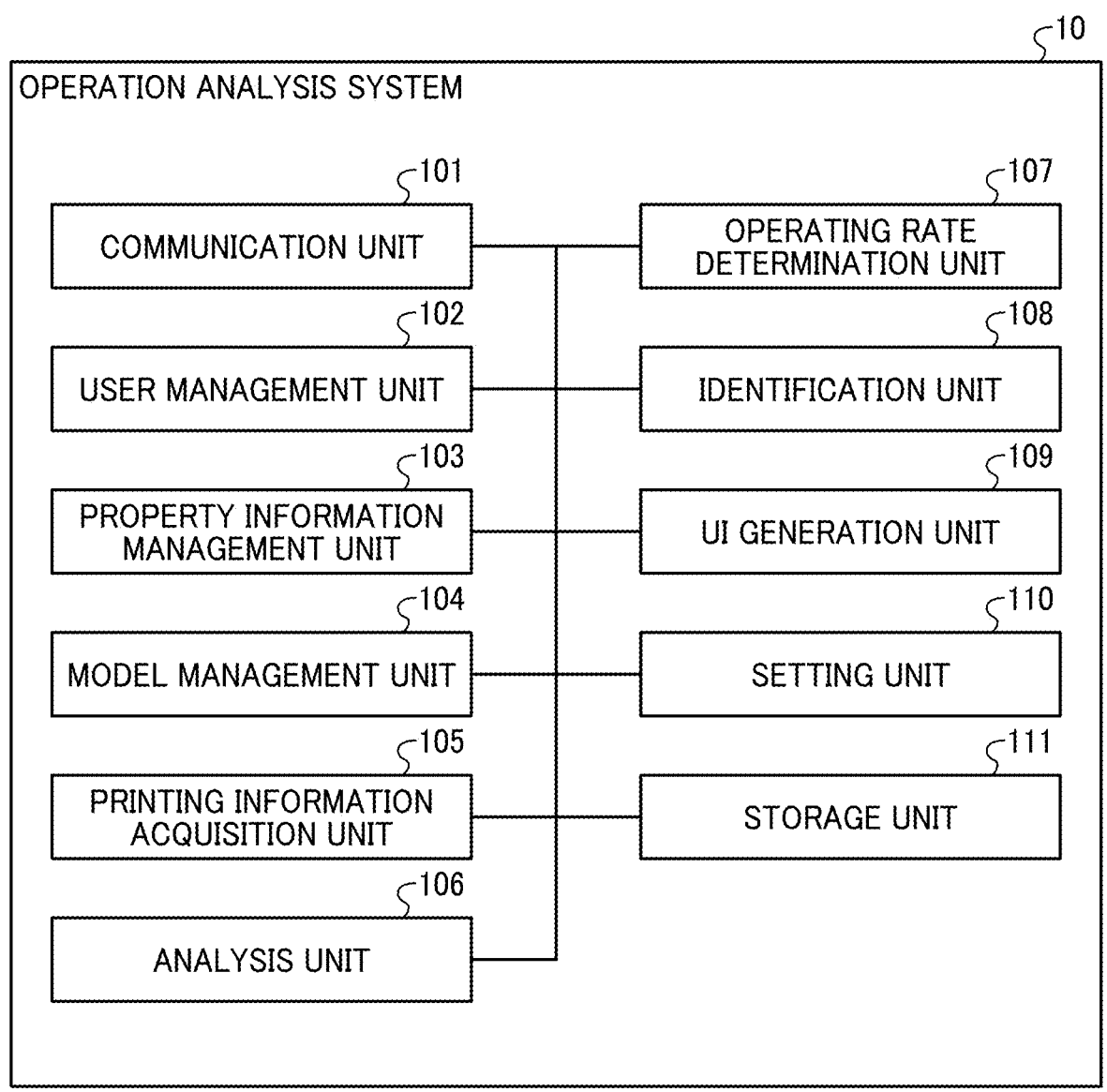
FIG. 4 is a block diagram illustrating an example of a functional configuration of the operation analysis system according to the first embodiment.
Figure 9:
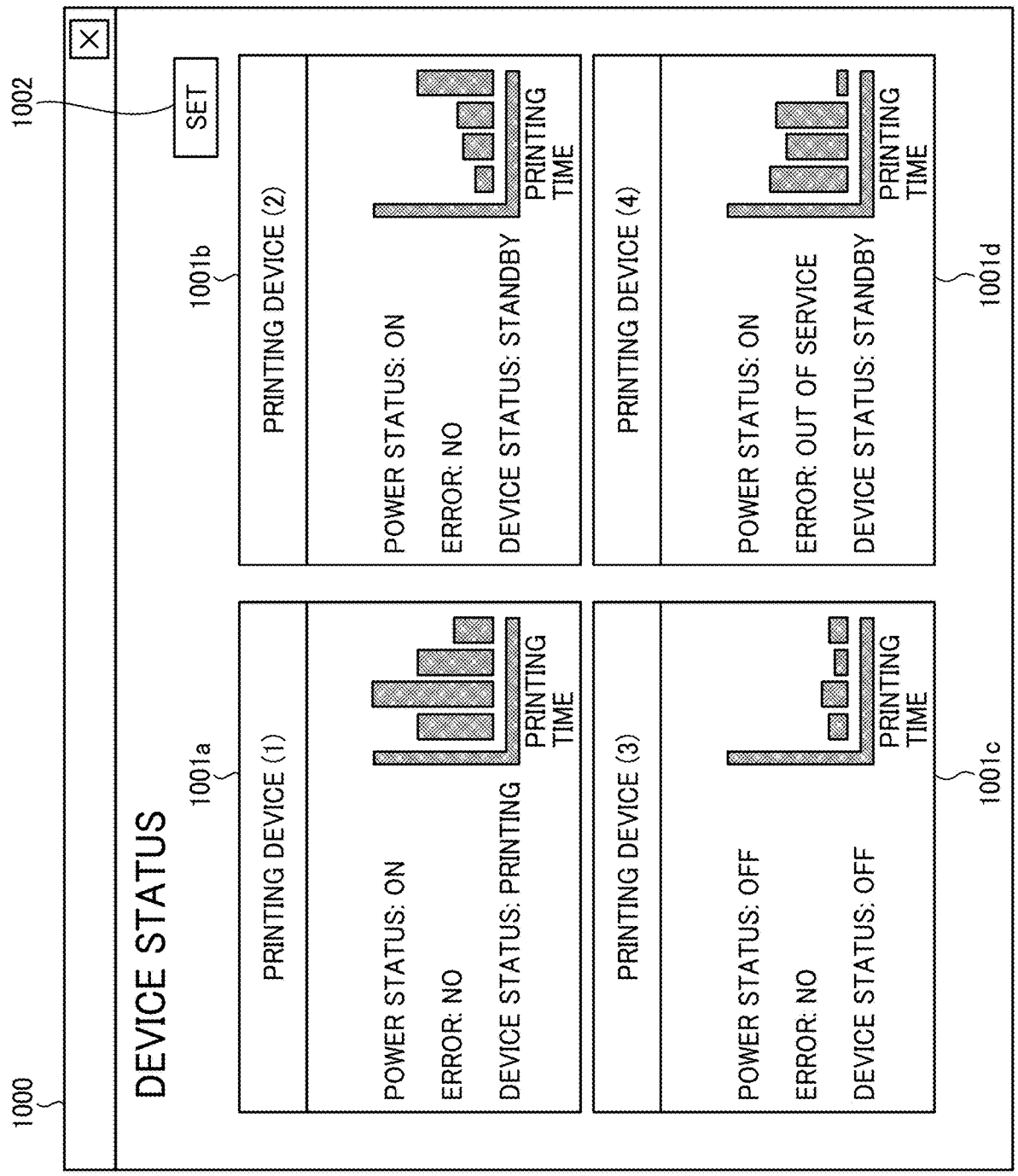
FIG. 9 is a diagram illustrating an example of a device status screen.
Figure 10:
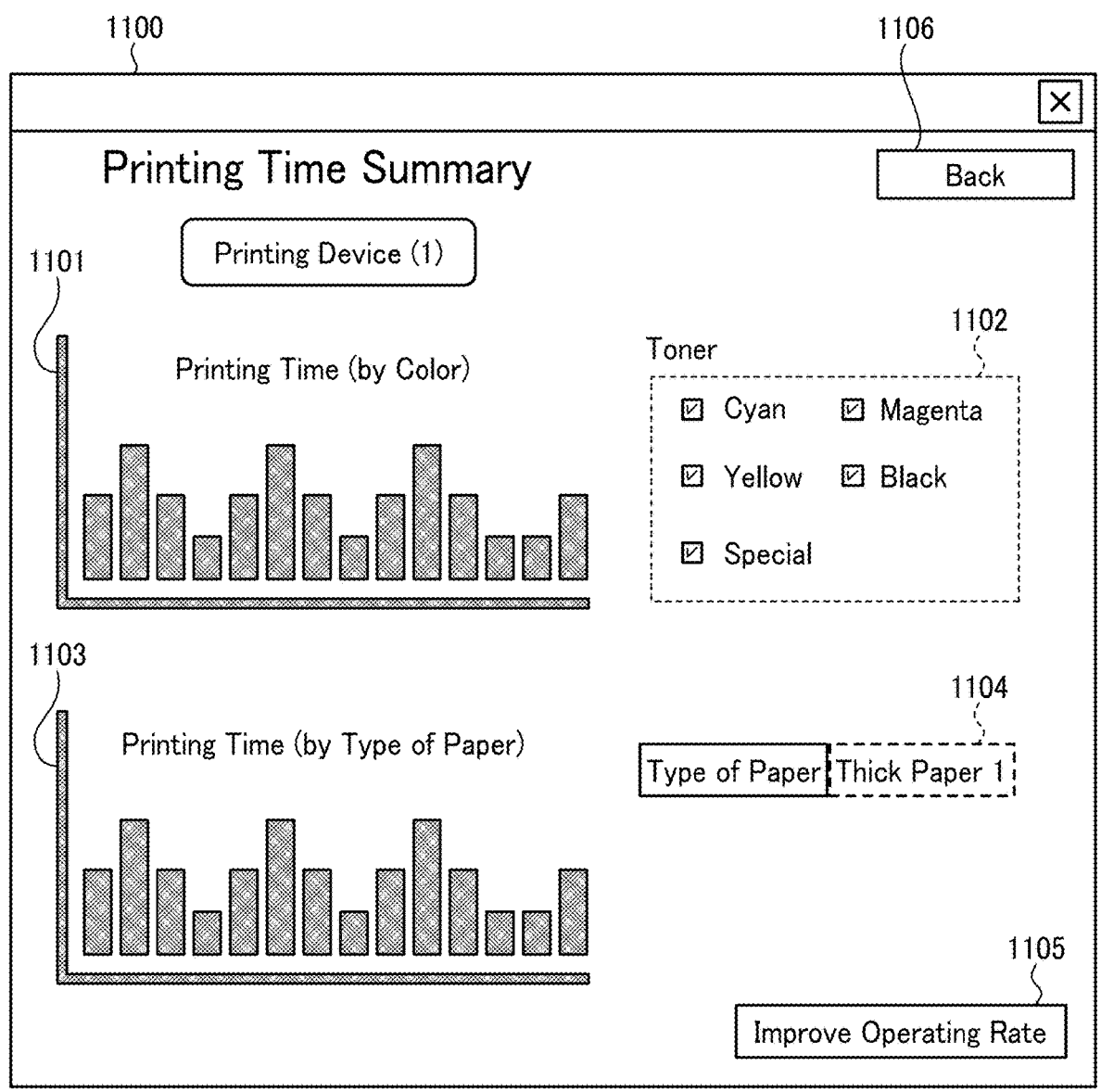
FIG. 10 is a diagram illustrating an example of a printing time summary screen.
Figure 11:
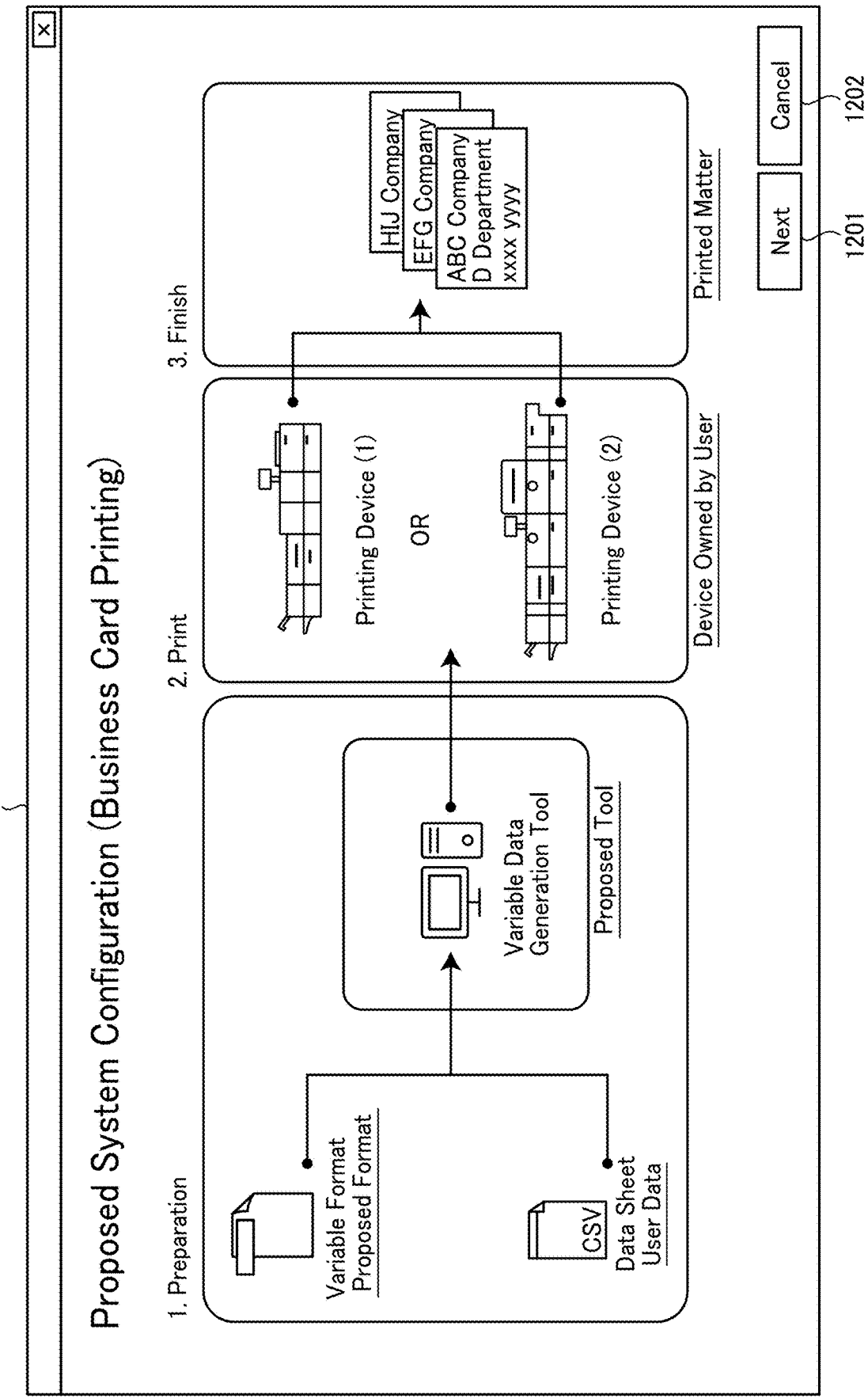
FIG. 11 is a diagram illustrating an example of an offering model presentation screen.
Figure 12:
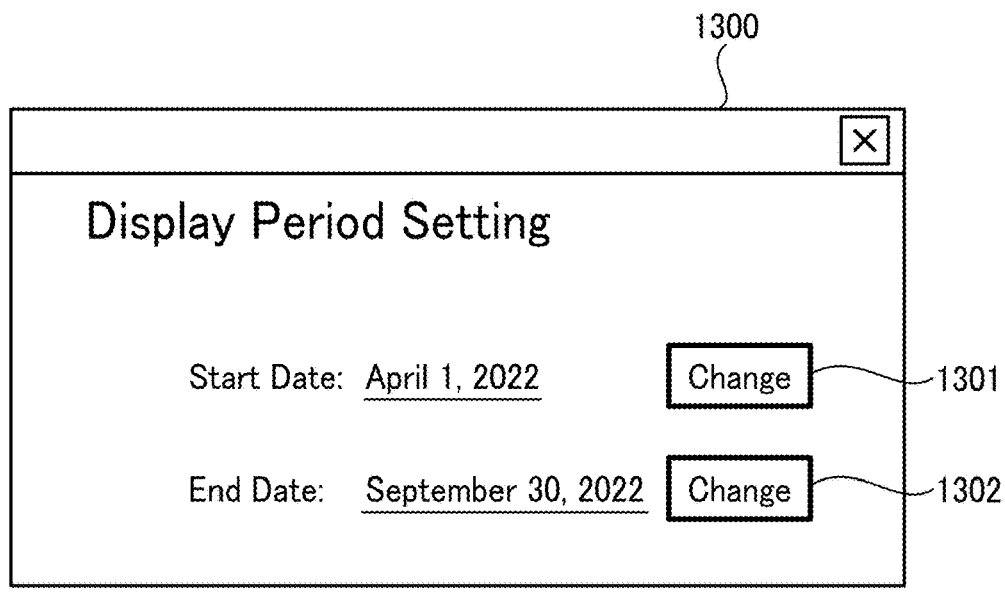
FIG. 12 is a diagram illustrating an example of a display period setting screen.

FIG. 4 is a block diagram illustrating an example of a functional configuration of the operation analysis system according to the first embodiment. FIG. 5 is a table illustrating an example of owned device information. FIG. 6 is a table illustrating an example of property information of a printing device. FIG. 7 is a table illustrating an example of offering model management information. FIG. 8 is a table illustrating an example of operating rate information of the printing device. FIG. 9 is a diagram illustrating an example of a device status screen. FIG. 10 is a diagram illustrating an example of a printing time summary screen. FIG. 11 is a diagram illustrating an example of an offering model presentation screen. FIG. 12 is a diagram illustrating an example of a display period setting screen.

The configuration and operation of functional blocks of the operation analysis system 10 according to the present embodiment is described with reference to FIGS. 4 to 12.

As illustrated in FIG. 4, the operation analysis system 10 includes a communication unit 101, a user management unit 102, a property information management unit 103 (first management unit), a model management unit 104 (second management unit), a printing information acquisition unit 105 (acquisition unit), an analysis unit 106, an operating rate determination unit 107 (first determination unit), an identification unit 108, a user interface (UI) generation unit 109 (generation unit), a setting unit 110, and a storage unit 111.

The communication unit 101 is a functional unit that performs data communication with the printing device 20 and the client PC 30 through the network N. The communication unit 101 is implemented by executing a program by the network I/F 509 and the CPU 501 illustrated in FIG. 2.

The user management unit 102 is a functional unit that associates and manages identifiers (IDs) and models of printing devices 20 owned by the users of companies and the like for each printing device 20. For example, as illustrated in FIG. 5, the user management unit 102 stores a user ID that is user identification information, a device ID that is identification information of the printing device 20 owned by the user, and a model name of the printing device 20. The associated owned device information is stored and managed in the storage unit 111. The user management unit 102 performs registration, change, and deletion processing for owned device information. Note that the registration of the owned device information by the user management unit 102 may be performed according to the operation of the keyboard 511 and the pointing device 512 by an administrator, or may be performed based on information transmitted from the printing device 20. In the owned device information illustrated in FIG. 5, for example, the user ID "AAA," the device ID "A02," and the model "model B" are associated.

The property information management unit 103 is a functional unit that associates and manages the model of the printing device 20 and information as to whether the model corresponds to each property. For example, as illustrated in FIG. 6, the property information management unit 103 stores property information for associating the model of the printing device 20 with information indicating whether each property is supported in the storage unit 111. The property information management unit 103 performs registration, change, and deletion processing for the property information. The property of the model of the printing device 20 refers to, for example, whether the printing device 20 supports photo printing, special paper printing, special color printing, mixed paper type printing, and the like. In the property information illustrated in FIG. 6 indicates, for example, that the "model B" partly supports printing of the property "photograph", does not support printing of the property "special paper", and supports printing of the property "special color".

As illustrated in FIG. 7, the model management unit 104 is a functional unit that stores the offering model management information (model management information) in association with the property (device property) of the printing device 20, the printing service corresponding to the property, and the offering model, which is a system configuration for implementing the printing service in the storage unit 111. For example, a user who owns a printing device 20 having the property capable of printing photographs can use the printing device 20 to provide a photobook printing service. However, in order to provide the photobook printing service, in addition to the existing printing device 20, software for creating the print data, device for binding after printing with the printing device 20, and the like are to be provided. The offering model is the system configuration that includes the software tool and device as a set. In the offering model management information illustrated in FIG. 7, for example, the property (device property) "special paper," the print service "booklet printing," and the offering model "system configuration C" are associated.

The printing information acquisition unit 105 is a functional unit for acquiring through the network and communication unit 101, information related to printing of each printing device 20 and status information of each printing device 20 (status of the printing device 20, power status and information such as status and whether an error has occurred), and the like, as printing device information. The printing information acquisition unit 105 causes the storage unit 111 to store the acquired printing device information. The information related to printing refers to, for example, the type and remaining amount of toner or ink in executing each job, type and remaining volume of paper, number of prints, and printing time (start time, end time). The printing information acquisition unit 105 acquires the printing device information from each printing device 20, for example, each time a job is executed by each printing device 20 or at predetermined intervals (for example, once a day).

The analysis unit 106 is a functional unit for performing various analysis on the printing device information acquired by the printing information acquisition unit 105. As an example of the analysis, the analysis unit 106 calculates the printing time for each color of toner or ink and for each type of paper based on the printing device information, calculates standby time indicating the time in which the printing device is not in operation, and calculates an operating rate, which is a rate of the printing time to the total time of the printing time and the standby time (for example, 8 hours, which is the prescribed time for corporate activities). Also, the analysis unit 106 calculates the printing time, standby time, and operating rate, for example, for each day in a certain period.

The analysis unit 106, as illustrated in FIG. 8, associates the device ID of the printing device 20, the date and time of calculation, the calculated printing time, the calculated standby time, and calculates the operating rate and stores in the storage unit 111 as the operating rate information. In the operating rate information illustrated in FIG. 8, device ID "A02," date and time "4/2/2022," printing time "1.6," standby time "6.4," and operating rate "20" are associated.

The operating rate determination unit 107 is a functional unit for determining whether the operating rate calculated by the analysis unit 106 for each printing device 20 is equal to or lower than a predetermined value (first predetermined value). The printing device 20 whose operating rate is equal to or lower than the predetermined value is identified as a target to present an offering model for improving the operating rate. The first predetermined value may be previously set, for example, according to the empirical rule and stored in any desired memory.

The identification unit 108 is a functional unit for identifying, from the offering model management information, the printing service and the offering model according to the property of the printing device 20 included in the property information based on determination by the operating rate determination unit 107 that the operating rate of the printing device 20 is equal to or lower than the predetermined value, in order to improve the operating rate of the printing device 20.

The UI generation unit 109 is a functional unit for generating screen information for various screens to be displayed on the client PC 30. The UI generation unit 109 transmits screen information of various screens to the client PC 30 through the communication unit 101 in response to requests from the client PC 30 (by designating, for example, uniform resource locator (URL), etc.). The transmission of screen information of various screens by the UI generation unit 109 may be performed after an authentication process of the operation analysis system 10 is performed by the login operation of the client PC 30.

For example, based on the status information included in the printing device information acquired by the printing information acquisition unit 105, the UI generation unit 109 generates screen information of the device status screen 1000 illustrated in FIG. 9 which displays the power status of each printing device 20 owned by the user, presence or absence of an error, and the device status. The device status screen 1000 includes printing device buttons 1001a to 1001d and a setting button 1002, as illustrated in FIG. 9.

The printing device buttons 1001a to 1001d are buttons for displaying the power status, the presence or absence of an error, and the device status of each printing device 20 owned by a specific user (printing device (1) to printing device (4) in FIG. 9). Each of the printing device buttons 1001a to 1001d may display a graph of printing time as illustrated in FIG. 9. In response to a pressing of the printing device buttons 1001a to 1001d, the client PC 30 transmits to the operation analysis system 10 a request to display a printing time summary screen 1100 of the corresponding printing device 20 illustrated in FIG. 10.

A setting button 1002 is a button for displaying a display period setting screen 1300 illustrated in FIG. 12. The display period setting screen 1300 is described below.

In response to a pressing of any one of the printing device buttons 1001a to 1001d on the device status screen 1000 displayed on the client PC 30, the UI generation unit 109 generates screen information for the printing time summary screen 1100) illustrated in FIG. 10 based on the operating rate information of the printing device 20 corresponding to the pressed button.

The printing time summary screen 1100 illustrated in FIG. 10 is a screen for displaying graphs of printing times for each color and type of paper of the printing device 20 selected on the device status screen 1000. As illustrated in FIG. 10, the printing time summary screen 1100 includes a printing time graph by color 1101, a color selection check box 1102, a printing time graph by type of paper 1103, a paper selection button 1104, an operating rate improvement button 1105, and a back button 1106.

The printing time graph by color 1101 is a graph summarizing the execution time (printing time) of a job using the toner (or ink) color selected in the color selection check box 1102.

For example, a printing time graph by color 1101 has time on the horizontal axis and printing time on the vertical axis, and illustrates the total value of the printing time at each hour (or at predetermined intervals) in a bar graph or the like.

The color selection check box 1102 is a check box for selecting a toner (or ink) color to be included in the printing time in the printing time graph by color 1101 for each color. In the example illustrated in FIG. 10, the color selection check box 1102 allows selection of cyan, magenta, yellow, black, and special color.

The printing time graph by type of paper 1103 is a graph summarizing the execution time (printing time) of a job using the type of paper selected by the paper selection button 1104. For example, the printing time graph by type of paper 1103 has time on the horizontal axis and printing time on the vertical axis, and illustrates the total value of the printing time at each hour (or at predetermined intervals) in a bar graph or the like.

The paper selection button 1104 is a button for selecting the type of paper to be included in the printing time in the printing time graph by type of paper 1103. In the example illustrated in FIG. 10, "thick paper 1" is selected.

The operating rate improvement button 1105 is a button for displaying an offering model presentation screen 1200 (an example of the presentation screen) illustrated in FIG. 11 based on the printing service and offering model selected by the identification unit 108. In response to pressing the operating rate improvement button 1105, a request for displaying the offering model presentation screen 1200 for the printing device 20 whose printing time is displayed on the printing time summary screen 1100 is sent from the client PC 30 to the operation analysis system 10.

Further, in response to a pressing of the operating rate improvement button 1105 on the printing time summary screen 1100 displayed on the client PC 30, the UI generation unit 109 generates screen information of an offering model presentation screen 1200 as illustrated in FIG. 11 for proposing the printing service and the offering model for improving the operating rate of the target printing device 20 selected by the identification unit 108.

As illustrated in FIG. 11, the offering model presentation screen 1200 is a screen for proposing the printing service and offering model for improving the operating rate of the target printing device 20. Specifically, in the example of the offering model presentation screen 1200 illustrated in FIG. 11, the proposed printing service is "business card printing" and a system configuration for implementing the printing service using existing printing devices 20 owned by the user who received the proposal (printing device (1) and printing device (2) in the example of FIG. 11) is displayed as the offering model. As for the system configuration, the proposal includes a new variable format, which is format data to be used for outputting business card printing, and introduction of a new tool for generating variable data. The printing service and offering model proposal illustrated on the offering model presentation screen 1200 is an example and in addition to data and software, introduction of new hardware such as a finisher having a stapling function may be proposed.

As illustrated in FIG. 11, the offering model presentation screen 1200 includes a next button 1201 and a cancel button 1202. In the case multiple sets of print services and offering models are identified by the identification unit 108 and the UI generation unit 109 generates screen information for a screen that proposes an offering model corresponding to each set of the multiple sets of print services and offering models, the next button 1201 switches to a screen that proposes another offering model. The cancel button 1202 is a button for returning to the printing time summary screen 1100.

The setting unit 110 is a functional unit that sets the display period (target period) of the printing time graph displayed on the printing time summary screen 1100 according to the operation on the display period setting screen 1300 illustrated in FIG. 12 displayed on the client PC 30, by pressing the setting button 1002 on the device status screen 1000. The setting unit 110 causes the storage unit 111 to store created display period setting information. The UI generation unit 109 generates screen information for the printing time summary screen 1100 based on the display period setting information set by the setting unit 110.

The display period setting screen 1300 includes a start date change button 1301 and an end date change button 1302, as illustrated in FIG. 12. The start date change button 1301 is a button for setting the start date of the display period of the printing time graph displayed on the printing time summary screen 1100. The end date change button 1302 is a button for setting the end date of the display period of the printing time graph displayed on the printing time summary screen 1100.

The analysis unit 106 calculates the printing time for each color of toner or ink and for each type of paper based on the printing device information within the display period set by the setting unit 110, calculates the standby time that indicates the time in which the printing device is not in operation, and calculates the operating rate.

The storage unit 111 is a functional unit that stores various types of information such as the owned device information, property information, offering model management information, printing device information, and operating rate information. The storage unit 111 is implemented by the HD 504 illustrated in FIG. 2.

The user management unit 102, the property information management unit 103, the model management unit 104, the printing information acquisition unit 105, the analysis unit 106, the operating rate determination unit 107, the identification unit 108, the UI generation unit 109, and the setting unit 110 described above are implemented by executing programs by the CPU 501 illustrated in FIG. 2. The functional units described above are not limited to be implemented by executing programs by the CPU 501 in FIG. 2, but, for example, the functional units may be implemented by hardware such as an integrated circuit, or may be implemented by using the software and hardware together.

Each functional unit of the operation analysis system 10 illustrated in FIG. 4 conceptually illustrates the function, and is not limited to the configuration illustrated in FIG. 4. For example, a plurality of functional units illustrated as independent functional units of the operation analysis system 10 in FIG. 4 may be configured as one functional unit. On the other hand, in FIG. 4, the function of one functional unit of the operation analysis system 10 may be divided into a plurality of functions and configured as a plurality of functional units.

Further, the screen information of the device status screen 1000, the printing time summary screen 1100, the offering model presentation screen 1200, and the display period setting screen 1300 are web page information defined in, for example, HyperText Markup Language (HTML), Cascading Style Sheets (CSS), JAVASCRIPT (registered trademark), or the like.

Figure 13:
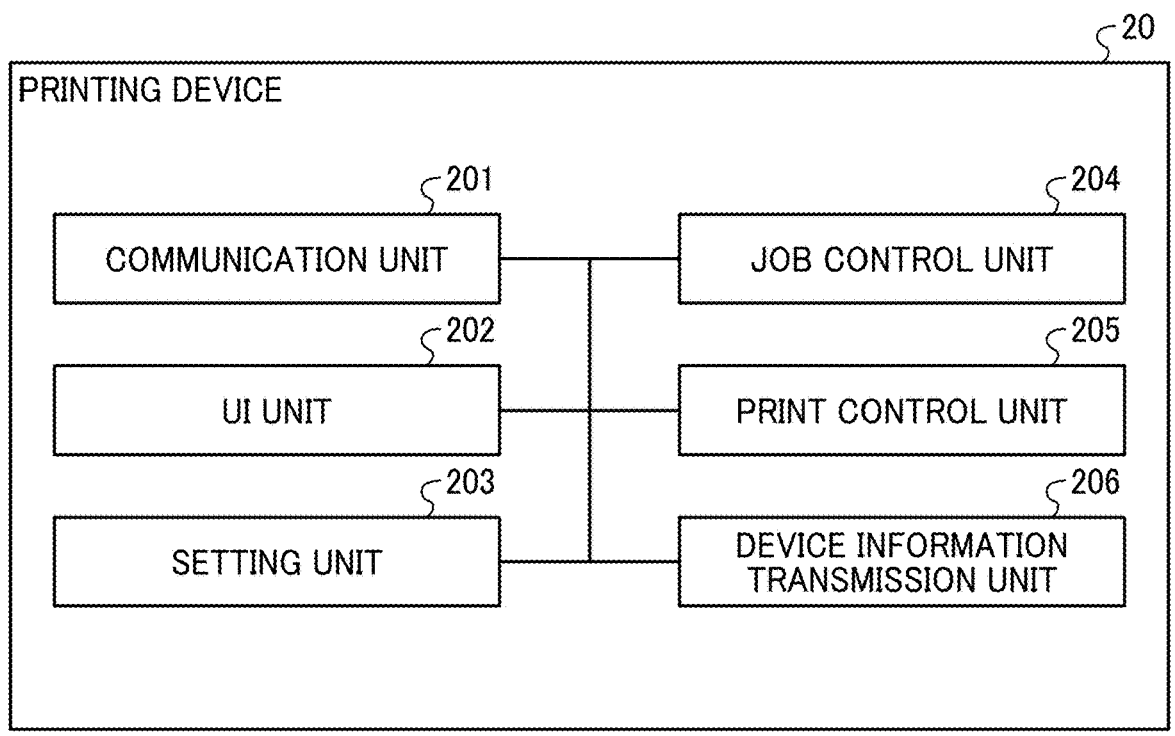
FIG. 13 is a block diagram illustrating an example of a functional configuration of the printing device according to the first embodiment.

FIG. 13 is a block diagram illustrating an example of a functional configuration of the printing device 20 according to the first embodiment. The functional configuration and operation of the printing device 20 according to the present embodiment is described with reference to FIG. 13.

As illustrated in FIG. 13, the printing device 20 includes a communication unit 201, a UI unit 202, a setting unit 203, a job control unit 204, a printing control unit 205 and a device information transmission unit 206.

The communication unit 201 is a functional unit that performs data communication with the operation analysis system 10 and the client PC 30 through the network N. For example, the communication unit 201 sends printing device information of the printing device 20 to the operation analysis system 10 through the network N each time a job is executed or at predetermined intervals in response to a command from the device information transmission unit 206. The communication unit 201 also receives job information of print data from the client PC 30 through the network N. The communication unit 201 is implemented by executing a program by the network I/F 604b and the CPU 601 illustrated in FIG. 3.

The UI unit 202 is a functional unit for displaying various screens such as a status screen of the printing device 20, a job execution screen, and a setting screen on the control panel 610.

The setting unit 203 is a functional unit for performing various settings such as setting of paper in a paper tray, setting of a toner bottle or an ink cartridge mounted, and the like, by operating a setting screen displayed on the control panel 610. The setting unit 203 stores the set setting information in the auxiliary storage device 608.

The job control unit 204 is a functional unit for controlling job execution, interruption, resumption, and the like according to an operation on a job execution screen displayed by the UI unit 202.

The printing control unit 205 is a functional unit for controlling various units (the plotter 631 and the scanner 632, or a development unit, a transfer unit, a paper ejection unit, and the like) of the printing device 20 according to job control by the job control unit 204.

The device information transmission unit 206 is a functional unit that collects information related to printing and status information of the printing device 20 as printing device information and transmits the printing device information to the operation analysis system 10 through the communication unit 201 at predetermined intervals.

The above-described UI unit 202, setting unit 203, job control unit 204, printing control unit 205, and device information transmission unit 206 are implemented by executing programs by the CPU 601 illustrated in FIG. 3. The functional units described above are not limited to be implemented by executing programs by the CPU 601 in FIG. 3, but, for example, the functional units may be implemented by hardware such as an integrated circuit, or may be implemented by using the software and hardware together.

Each functional unit of the printing device 20 illustrated in FIG. 13 conceptually illustrates the functions, and the functional configuration is not limited to such an example. For example, a plurality of functional units illustrated as independent functional units of the printing device 20 in FIG. 13 may be configured as one functional unit. On the other hand, the function of one functional unit of the printing device 20 in FIG. 13 may be divided into a plurality of functional units.

Figure 14:
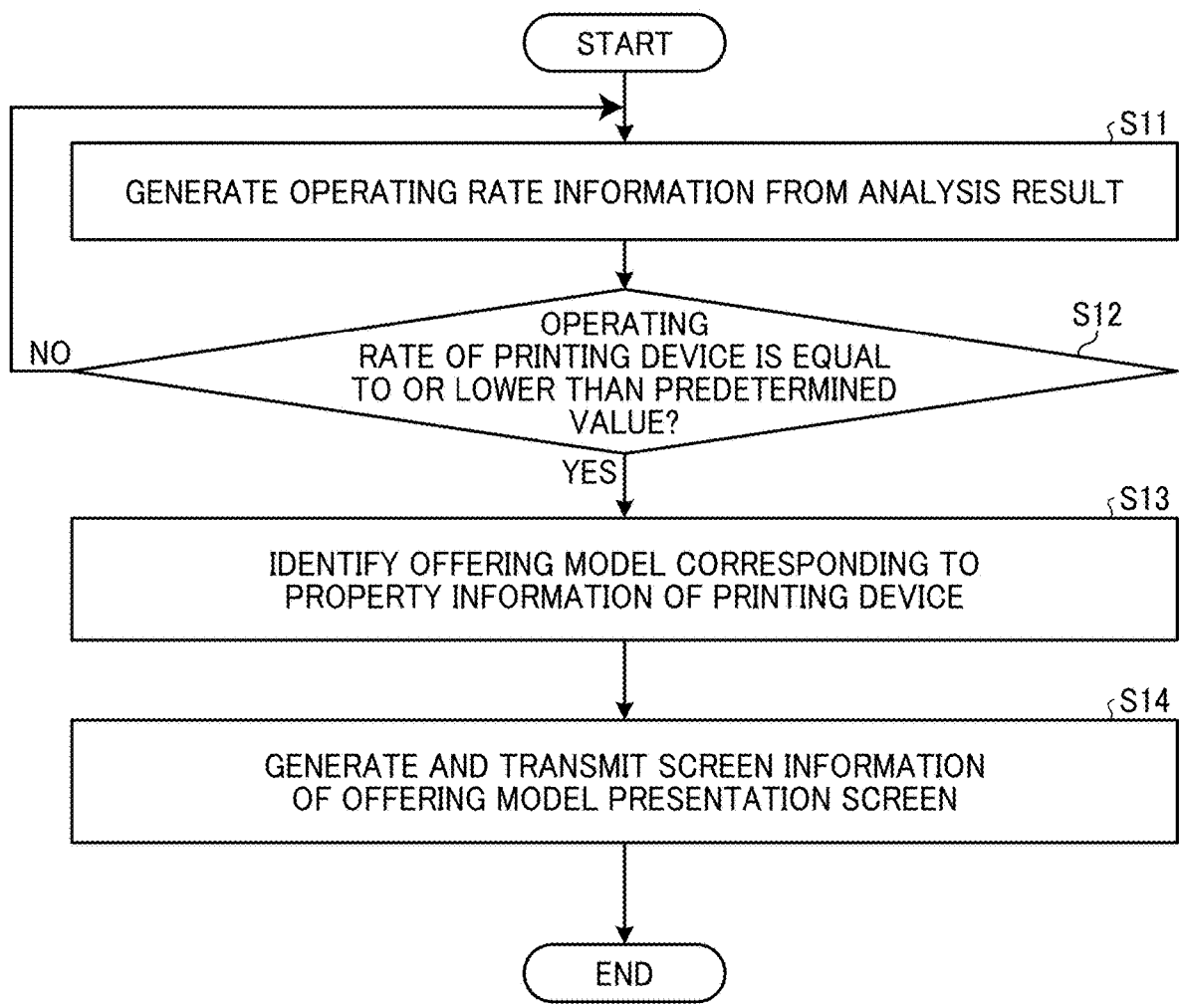
FIG. 14 is a flowchart illustrating an example of an offering model presentation process of the operation analysis system according to the first embodiment.

FIG. 14 is a flowchart illustrating an example of an offering model presentation process of the operation analysis system 10 according to the first embodiment. The offering model presentation process of the operation analysis system 10 according to the present embodiment is described with reference to FIG. 14.

<Step S11>

The printing information acquisition unit 105 of the operation analysis system 10 acquires printing device information from each printing device 20 each time a job is executed by each printing device 20 or at predetermined intervals (for example, once a day). The analysis unit 106 of the operation analysis system 10 performs various analysis on the printing device information acquired by the printing information acquisition unit 105. As examples of the analysis, the analysis unit 106 calculates the printing time for each color of toner or ink and for each type of paper based on the printing device information, calculates the standby time that indicates the time in which the printing device is not in operation, and calculates the operating rate based on the printing time and the standby time. Also, the analysis unit 106 calculates the printing time, standby time, and operating rate, for example, for each day in a certain period. The analysis unit 106 generates operating rate information that associates the device ID of the printing device 20, date and time of the calculation, the calculated printing time, the calculated standby time, and the calculated operating rate, and stores in the storage unit 111. Then, the process proceeds to step S12.

<Step S12>

The operating rate determination unit 107 of the operation analysis system 10 determines whether the operating rate calculated by the analysis unit 106 for each printing device 20 is equal to or lower than a predetermined value (first predetermined value). Based on determination that the operating rate is equal to or lower than the predetermined value (step S12: Yes), the printing device 20 is identified as a target for proposing an offering model for improving the operating rate, and the process proceeds to step S13. Based on determination that the operating rate is not equal to nor lower than the predetermined value (step S12: No), the process returns to step S11.

<Step S13>

The identification unit 108 of the operation analysis system 10 identifies a printing service and an offering model according to the property of the printing device 20 included in the property information from the offering model management information, in order to improve the operating rate of the printing device 20 that has the operating rate equal to or lower than the predetermined value as determined by the operating rate determination unit 107. Then, the process proceeds to step S14.

<Step S14>

In response to a pressing of an operating rate improvement button 1105 on the printing time summary screen 1100 displayed on the client PC 30, the UI generation unit 109 of the operation analysis system 10 generates screen information of an offering model presentation screen 1200 for proposing the printing service and the offering model identified by the identification unit 108 for improving the operating rate of the target printing device 20, and transmits the screen information to the client PC 30 through the communication unit 101. The client PC 30 displays the offering model presentation screen 1200 based on the screen information.

Through steps S11 to S14 described above, the offering model presentation process of the operation analysis system 10 is executed.

As described above, in the operation analysis system 10 according to the present embodiment, the printing information acquisition unit 105 acquires information related to printing from the printing device 20, the analysis unit 106 calculates the operating rate of the printing device 20 from the information related to printing, the operating rate determination unit 107 determines whether the operating rate is equal to or lower than the predetermined value, the identification unit 108 identifies a system configuration offering model that improves the operating rate of the printing device 20 based on the property of the printing device 20 having the operating rate equal to or lower than the predetermined value, and the UI generation unit 109 generates screen information for the offering model presentation screen 1200 for presenting the offering model. As a result, the offering model, which is a system capable of improving the operating rate of the printing device 20, is presented based on the information related to the printing of the printing device 20.

An information processing system 1 according to a second embodiment is described, focusing on points that are different from the information processing system 1 according to the first embodiment. In the present embodiment, an operation of including a job type rate in the operating rate information and identifying a print service and an offering model based on an operator condition related to the job type rate is described. The overall configuration of the information processing system 1 according to the present embodiment and the hardware configuration of the operation analysis system 10a, the printing device 20, and the client PC 30 are the same as those described in the first embodiment.

Figure 15:
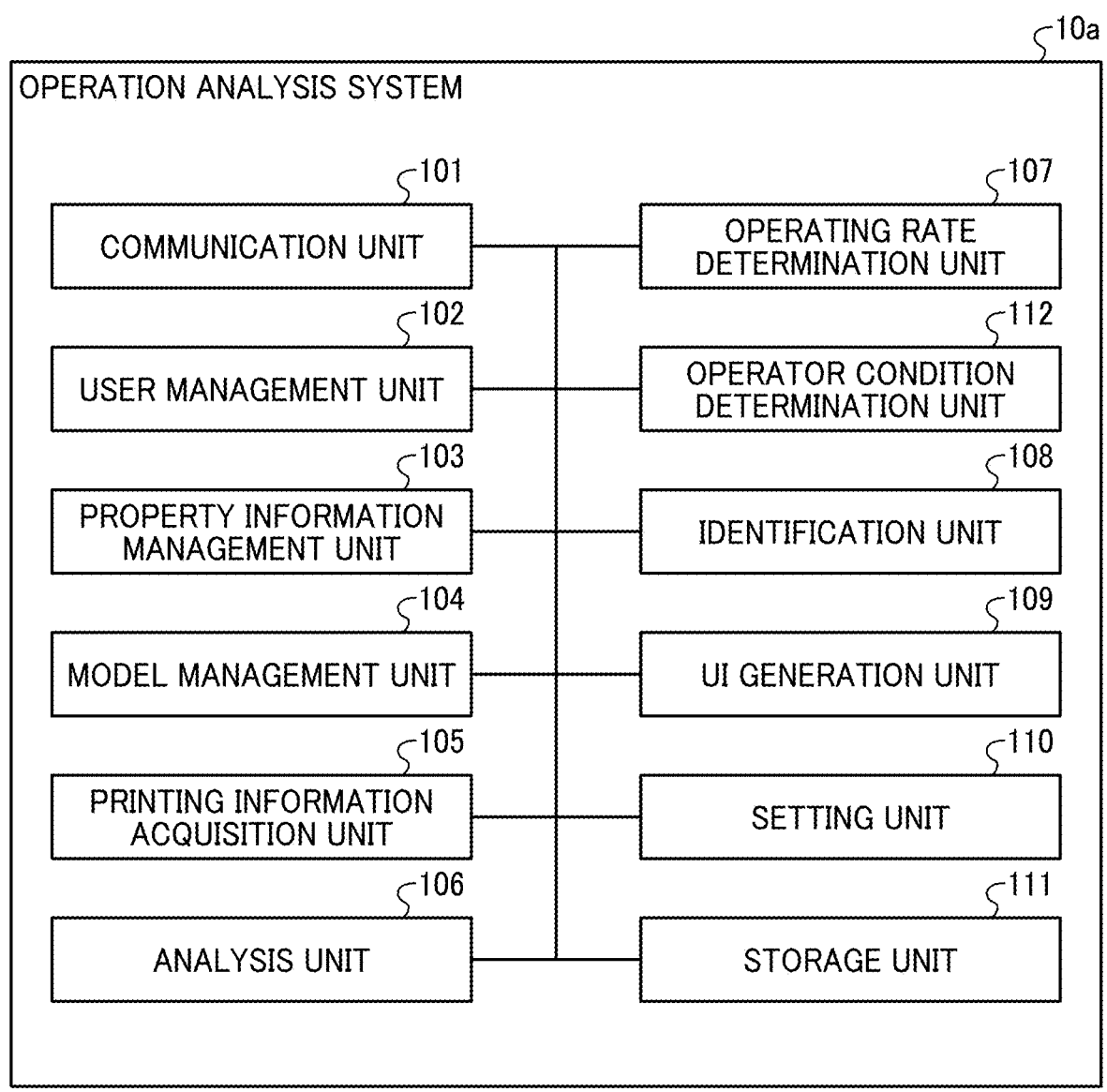
FIG. 15 is a block diagram illustrating an example of a functional configuration of the operation analysis system according to a second embodiment.

FIG. 15 is a block diagram illustrating an example of a functional configuration of the operation analysis system 10a according to the second embodiment. FIG. 16 is a table illustrating an example of operating rate information of the printing device. FIG. 17 is a table illustrating an example of offering model management information. The configuration and operation of the functional blocks of the operation analysis system 10a according to the present embodiment is described with reference to FIGS. 15 to 17.

As illustrated in FIG. 15, the operation analysis system 10a includes the communication unit 101, the user management unit 102, the property information management unit 103, the model management unit 104, the printing information acquisition unit 105, the analysis unit 106, the operating rate determination unit 107, an operator condition determination unit 112 (second determination unit), the identification unit 108, the UI generation unit 109, the setting unit 110 and the storage unit 111.

The model management unit 104, as illustrated in FIG. 17, stores offering model management information associating a property of the printing device 20 (device property), an operator condition for determining whether the property is provided, a printing service corresponding to the property, an offering model, which is a system configuration for implementing the printing service, in the storage unit 111. For example, a user who owns a printing device 20 having a property capable of printing photographs, can use the printing device 20 to provide a photobook printing service. In this case, even if the printing device 20 has the property capable of printing photographs according to the property information described above, in order to implement a photobook printing service, printing capability of the printing device 20 is preferred to satisfy a predetermined condition (operator condition).

Therefore, the offering model management information of the present embodiment, as illustrated in FIG. 17, accepts registration of the operator condition regarding the printing capability of the printing device 20, in order to more reliably implement the printing service. In the offering model management information illustrated in FIG. 17, for example, the property (device property) "photograph", the operator condition "color rate is equal to or higher than a predetermined value", the print service "photo book", and the offering model "system configuration B" is associated.

The analysis unit 106 performs various analysis on the printing device information acquired by the printing information acquisition unit 105. As examples of the analysis, the analysis unit 106, calculates printing time by color of the toner or ink and by paper based on the printing device information, calculates the standby time for indicating the time in which the printing device is not in operation, and calculates the operating rate for indicating the rate of the printing time to the total time of the printing time and the standby time (for example, 8 hours, which is prescribed time for corporate activities). Further, the analysis unit 106 calculates the rate of job types executed by the printing device 20 (job type rate) based on the printing device information. Specifically, the analysis unit 106 calculates a color rate that indicates the rate of jobs printed with the color toners (cyan, magenta, yellow, and black (CMYK)) among the jobs executed by the printing device 20, and calculates a special color rate that indicates percentage of jobs printed with special colors. The color rate is the rate of jobs printed by color (CMYK) rather than monochrome printed jobs among the jobs that have been printed. The special color rate is the rate of jobs printed in special colors among the jobs printed. A user with a high color rate is presumed to be highly skilled in color management, and a user with a high special color rate is presumed to be accustomed to printing in special colors. In addition, the analysis unit 106 calculates the printing time, standby time, operating rate, and job type rate, for example, for each day in a certain period. The special colors refer to toners or inks (color materials) other than CMYK, such as gold, silver, white, clear, ultraviolet (UV), fluorescent, and light colors. The gold, silver, bronze, and the like are examples of colors of metallic toner or ink (color materials).

Then, the analysis unit 106 generates operating rate information associating, as illustrated in FIG. 16, device ID of the printing device 20, date and time of calculation, calculated printing time, calculated standby time, calculated operating rate, color rate, and special color rate and stores in the storage unit 111.

The operator condition determination unit 112 is a functional unit that determines whether an operator condition corresponding to the property (device property) of the printing device 20 in the offering model management information is satisfied for the printing device 20 for which the operating rate determination unit 107 has determined that the operating rate is equal to or lower than a predetermined value.

Based on determination by the operator condition determination unit 112 that the printing device 20 satisfies the operator condition, the identification unit 108 identifies the property of the printing device 20 managed by the property information and the printing service and offering model corresponding to the operator condition from the offering model management information, in order to improve the operating rate of the printing device 20 and implement a high-quality printing service.

The operations of other functional units are the same as those of the above-described first embodiment.

The user management unit 102, the property information management unit 103, the model management unit 104, the printing information acquisition unit 105, the analysis unit 106, the operating rate determination unit 107, the operator condition determination unit 112, the identification unit 108, the UI generation unit 109 and the setting unit 110 are implemented by executing programs by the CPU 501 illustrated in FIG. 2. The functional units described above are not limited to be implemented by executing programs by the CPU 501 in FIG. 2, but, for example, the functional units may be implemented by hardware such as an integrated circuit, or may be implemented by using the software and hardware together.

Further, each functional unit of the operation analysis system 10a illustrated in FIG. 15 conceptually represents a function and configuration is not limited to the example illustrated in FIG. 15. For example, a plurality of functional units illustrated as independent functional units of the operation analysis system 10a in FIG. 15 may be configured as one functional unit. On the other hand, the function of one functional unit of the operation analysis system 10a in FIG. 15 may be divided into a plurality of functional units.

Figure 18:
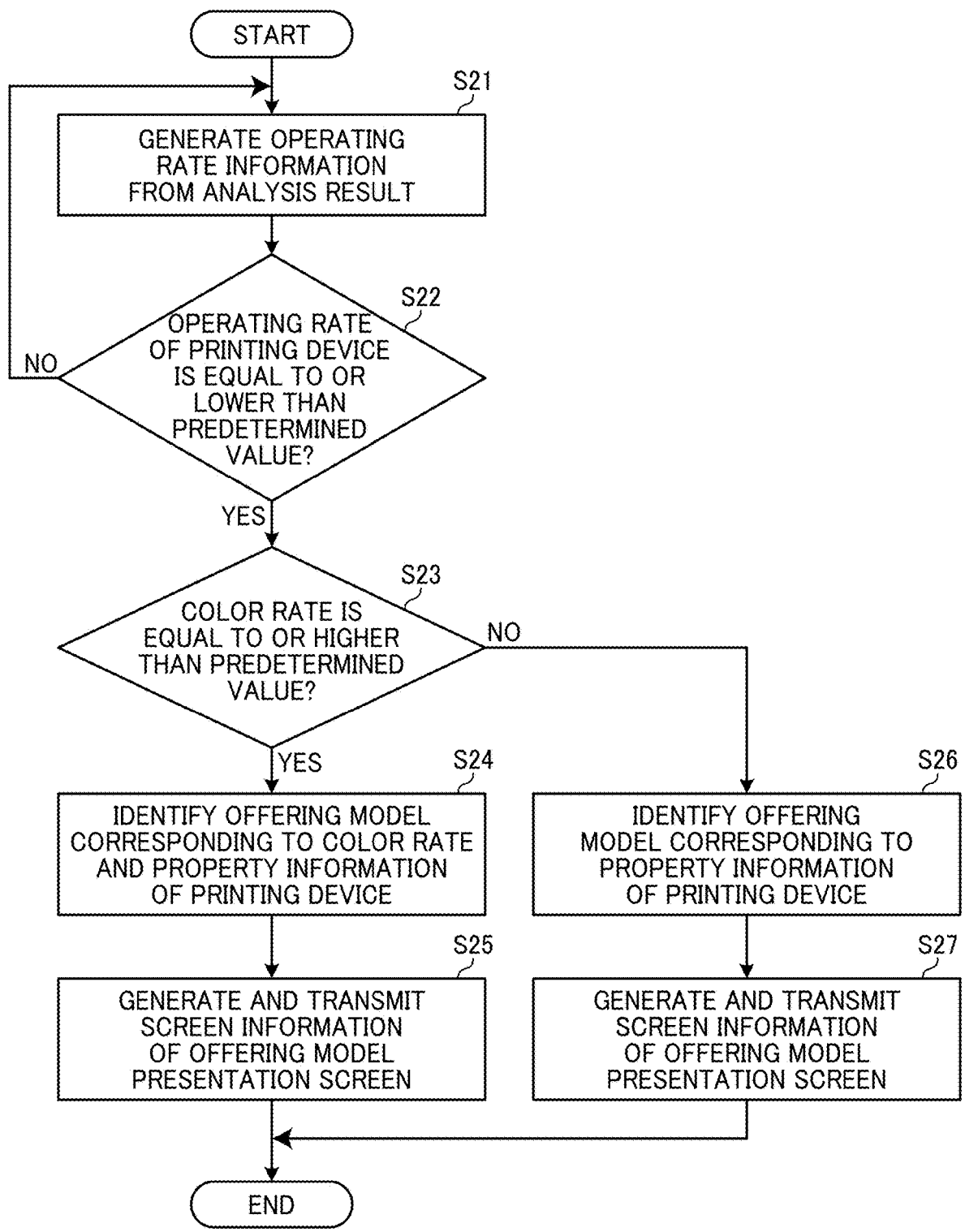
FIG. 18 is a flowchart illustrating an example of an offering model presentation process of the operation analysis system according to the second embodiment.

FIG. 18 is a flowchart illustrating an example of an offering model presentation process of the operation analysis system 10a according to the second embodiment. The offering model presentation process of the operation analysis system 10a according to the present embodiment is described with reference to FIG. 18.

<Step S21>

The printing information acquisition unit 105 of the operation analysis system 10a acquires printing device information from each printing device 20 each time a job is executed by each printing device 20 or at predetermined intervals (for example, once a day). The analysis unit 106 of the operation analysis system 10a performs various analysis on the printing device information acquired by the printing information acquisition unit 105. As examples of the analysis, the analysis unit 106, based on the printing device information, calculates printing time by color of the toner or ink and by paper, calculates the standby time indicating the time in which the printing device is not in operation, and calculates the operating rate that indicates the rate of the printing time to the total time of the printing time and the standby time (for example, 8 hours, which is prescribed time for corporate activities). Further, the analysis unit 106 calculates the rate of job type executed by the printing device 20 (job type rate) (an example of job type information) based on the printing device information.

Specifically, the analysis unit 106 calculates the color rate that indicates the rate of jobs printed with color toners (CMYK) among the jobs executed by the printing device 20, and calculates the special color rate that indicates rate of jobs printed with special colors. In addition, the analysis unit 106 calculates the printing time, standby time, operating rate, and job type rate, for example, for each day in a certain period. The analysis unit 106 generates the operating rate information associating the device ID of the printing device 20, date and time of calculation, calculated printing time, calculated standby time, calculated operating rate, color rate, and special color rate and stores in the storage unit 111. Then, the process proceeds to step S22.

<Step S22>

The operating rate determination unit 107 of the operation analysis system 10a determines whether the operating rate calculated by the analysis unit 106 for each printing device 20 is equal to or lower than a predetermined value. Based on determination that the operating rate is equal to or lower than the predetermined value (step S22: Yes), the printing device 20 is identified as a target for presenting an offering model for improving the operating rate, and the process proceeds to step S23. Based on determination that the operating rate is not equal to nor lower than the predetermined value (step S22: No), the process returns to step S21.

<Step S23>

The operator condition determination unit 112 of the operation analysis system 10a determines whether an operator condition corresponding to the property (device property) of the printing device 20 in the offering model management information is satisfied for the printing device 20 for which the operating rate determination unit 107 has determined that the operating rate is equal to or lower than the predetermined value. In the present embodiment, the operator condition is assumed to be whether the color rate is equal to or higher than a predetermined value. Based on determination that the operator condition is satisfied, that is, when the color rate is equal to or higher than the predetermined value (step S23: Yes), a determination is made that the user who owns the printing device 20 has high skill in color management, and the process proceeds to step S24. On the other hand, based on determination that the operator condition is not satisfied, that is, when the color rate is lower than the predetermined value (step S23: No), the process proceeds to step S26.

<Step S24>

The identification unit 108 of the operation analysis system 10a identifies the property of the printing device 20 included in the property information and the printing service and offering model corresponding to the operator condition from the offering model management information in order to improve the operating rate and to implement a high-quality printing service of the printing device 20 determined by the operator condition determination unit 112 that the operator condition is satisfied. Then, the process proceeds to step S25.

<Step S25>

In response to a pressing of an operating rate improvement button 1105 on the printing time summary screen 1100 displayed on the client PC 30, the UI generation unit 109 of the operation analysis system 10a generates screen information of an offering model presentation screen 1200 for proposing a printing service and an offering model identified by the identification unit 108 for improving the operating rate of the target printing device 20, and transmits the screen information to the client PC 30 through the communication unit 101. The client PC 30 displays the offering model presentation screen 1200 based on the screen information.

<Step S26>

The identification unit 108 identifies the printing service and the offering model according to the property of the printing device 20 included in the property information from the offering model management information, in order to improve the operating rate of the printing device 20 that has the operating rate equal to or lower than the predetermined value as determined by the operating rate determination unit 107. Then, the process proceeds to step S27.

<Step S27>

In response to a pressing of an operating rate improvement button 1105 on the printing time summary screen 1100 displayed on the client PC 30, the UI generation unit 109 generates screen information of the offering model presentation screen 1200 for proposing the printing service and the offering model identified by the identification unit 108 for improving the operating rate of the target printing device 20, and transmits the screen information to the client PC 30 through the communication unit 101. The client PC 30 displays the offering model presentation screen 1200 based on the screen information.

Through steps S21 to S27 described above, the offering model presentation process of the operation analysis system 10a is executed.

As described above, in the operation analysis system 10a according to the present embodiment, the analysis unit 106 acquires the job type rate from the information related to printing, the operator condition determination unit 112 determines whether the printing capability of the printing device 20 whose operating rate is equal to or lower than the predetermined value satisfies the operator condition based on the job type rate, and the identification unit 108 identifies the offering model of the system configuration corresponding to the property and printing capability of the printing device 20 that satisfies the operator condition. Accordingly, the offering model that better match the user's skills (printing capability) can be identified.

An information processing system 1 according to a third embodiment is described focusing on points that are different from the information processing system 1 according to the first embodiment. In the present embodiment, an operation of identifying a print service and an offering model based on the number of times replacement parts such as supplies (consumables) are replaced in addition to the operating rate is described. The overall configuration of the information processing system 1 according to the present embodiment and the hardware configuration of the operation analysis system 10, the printing device 20, and the client PC 30 are the same as those described in the first embodiment.

FIG. 19 is a diagram illustrating an example of operating rate information of the printing device 20. The configuration and operation of the functional blocks of the operation analysis system 10 according to the present embodiment is described with reference to FIGS. 4 and 19 described above.

The printing information acquisition unit 105 acquires information related to printing of each printing device 20 and status information of each printing device 20 as printing device information from each printing device 20 through the network and the communication unit 101. The printing information acquisition unit 105 causes the storage unit 111 to store the acquired printing device information. In addition to the above-described information, the information related to printing includes information indicating replacement of the replacement parts such as paper in the paper feed tray or a fifth toner bottle other than CMYK in the printing device 20. Replacing toner bottles or the like indicates changing, adding, or removing color material or modules used in the printing device. For example, according to the content to be printed, the operator replaces special color toner other than CMYK (for example, clear toner is changed to metallic toner), adds or removes color material, and changes arrangement order. Information indicating replacement of the replacement part is generated by a setting operation performed when the replacement part is replaced in the printing device 20 and is transmitted from the printing device 20 to the operation analysis system 10.

The analysis unit 106 performs various analysis on the printing device information acquired by the printing information acquisition unit 105. As examples of the analysis, the analysis unit 106, based on the printing device information, calculates printing time by color of the toner or ink and by paper, calculates the standby time indicating the time in which the printing device is not in operation, and calculates the operating rate that indicates the rate of the printing time to the total time of the printing time and the standby time (for example, 8 hours, which is prescribed time for corporate activities). Further, the analysis unit 106 counts the number of times the replacement part has been replaced (the number of replacements of replacement part) based on the information indicating that the replacement part has been replaced (an example of information regarding replacement) included in the printing device information. In addition, the analysis unit 106 calculates the printing time, standby time, operating rate, and number of replacement part replacements, for example, for each day in a certain period.

Then, the analysis unit 106, as illustrated in FIG. 19, generates operating rate information that associates the device ID of the printing device 20, the date and time of calculation, the calculated printing time, the calculated standby time, the calculated operating rate, and the counted number of replacements of replacement part, and stores in the storage unit 111. For example, the operating rate information illustrated in FIG. 19 includes device ID "A02," date and time "4/1/2022," printing time "4.0," standby time "4.0," operating rate "50," and the number of replacements of replacement part "10".

The operating rate determination unit 107 determines whether the operating rate calculated by the analysis unit 106 for each printing device 20 is equal to or lower than a predetermined value. The printing device 20 whose operating rate is equal to or lower than the predetermined value is identified as a candidate for presenting the offering model for improving the operating rate.

Further, the operating rate determination unit 107 determines whether the number of replacements of replacement part counted by the analysis unit 106 for the printing device 20 is equal to or higher than a predetermined value (second predetermined value). The printing device 20 whose number of replacements of replacement part is equal to or higher than the predetermined value is considered as having decreased work efficiency due to frequent replacements of replacement parts. The second predetermined value may be previously set, for example, according to the empirical rule and stored in any desired memory.

Based on determination by the operating rate determination unit 107 that the number of replacements of replacement part of the printing device 20 is equal to or higher than the predetermined value, the identification unit 108 identifies the printing service and the offering model that correspond to the property of the printing device 20 included in the property information and improve work efficiency from the offering model management information, in order to improve the operating rate of the printing device 20 and improve the work efficiency. The offering model that improves work efficiency refers to, for example, an offering model that reduces the number of replacements of the replacement parts and reduces the work time to replace the replacement parts. For example, the offering model may include an additional device provided externally or as a post-processing unit, devices that can be loaded with more colorants or modules than the current device, or a new device released after the current device.

Figure 20:
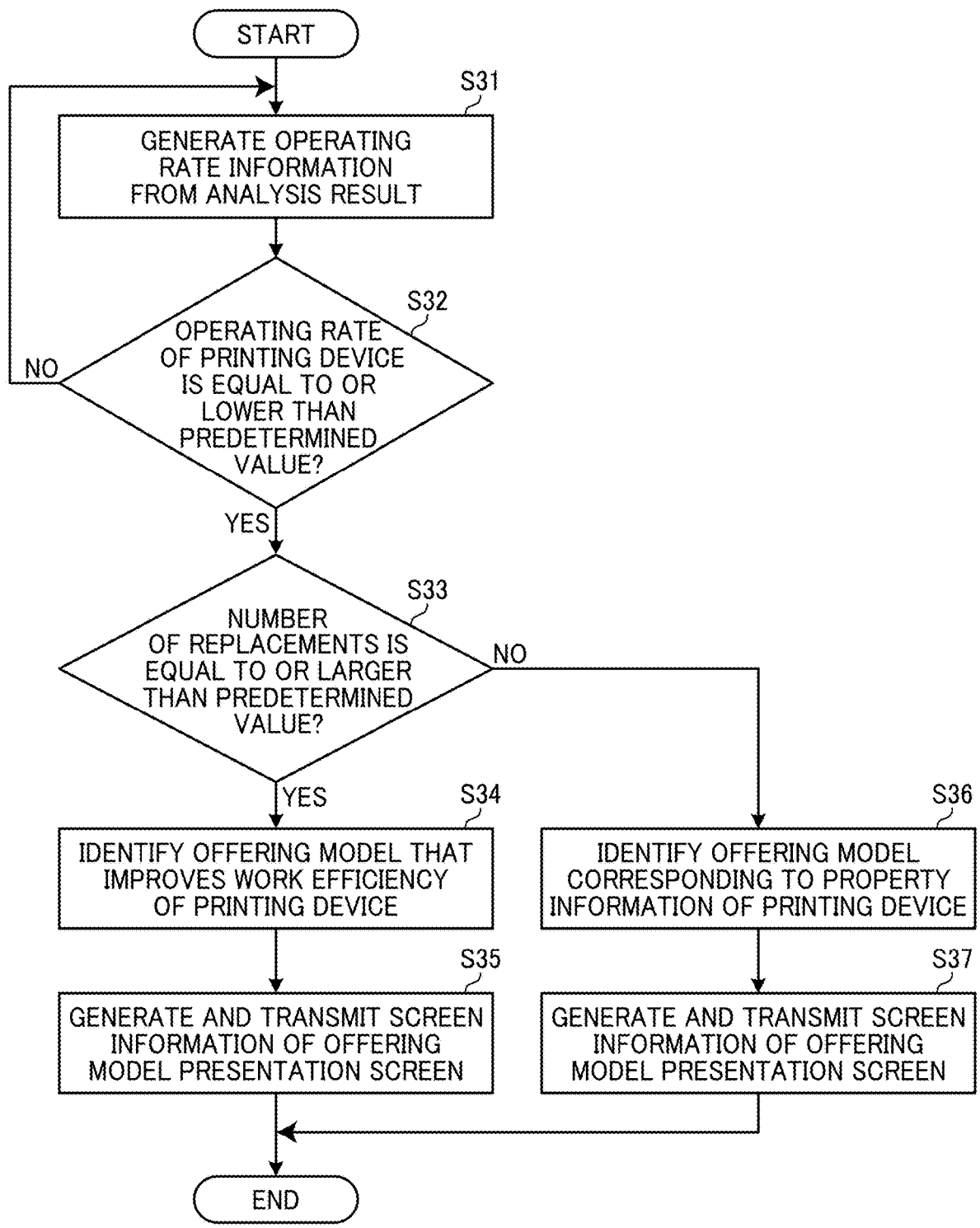
FIG. 20 is a flowchart illustrating an example of an offering model presentation process of the operation analysis system according to a third embodiment.

FIG. 20 is a flowchart illustrating an example of an offering model presentation process of the operation analysis system 10 according to the third embodiment. The offering model presentation process of the operation analysis system 10 according to the present embodiment is described with reference to FIG. 20.

<Step S31>

The printing information acquisition unit 105 of the operation analysis system 10 acquires printing device information from each printing device 20 each time a job is executed by each printing device 20 or at predetermined intervals (for example, once a day). The analysis unit 106 of the operation analysis system 10 performs various analysis on the printing device information acquired by the printing information acquisition unit 105. As examples of the analysis, the analysis unit 106, based on the printing device information, calculates printing time by color of the toner or ink and by paper, calculates the standby time indicating the time in which the printing device is not in operation, and calculates the operating rate that indicates the rate of the printing time to the total time of the printing time and the standby time (for example, 8 hours, which is prescribed time for corporate activities). Further, the analysis unit 106 counts the number of times the replacement part has been replaced (the number of replacements of the replacement part) based on the information indicating the replacement of replacement part included in the printing device information. In addition, the analysis unit 106 calculates the printing time, standby time, operating rate, and number of replacements of replacement part, for example, for each day in a certain period. Then, the analysis unit 106 generates operating rate information that associates the device ID of the printing device 20, the date and time of calculation, the calculated printing time, the calculated standby time, the calculated operating rate, and the counted number of replacements of replacement part, and stores in the storage unit 111. Then, the process proceeds to step S32.

<Step S32>

The operating rate determination unit 107 of the operation analysis system 10 determines whether the operating rate calculated by the analysis unit 106 for each printing device 20 is equal to or lower than a predetermined value. Based on determination that the operating rate is equal to or lower than the predetermined value (step S32: Yes), the printing device 20 is identified as a target for presenting an offering model for improving the operating rate, and the process proceeds to step S33. Based on a determination that the operating rate is not equal to or lower than the predetermined value (step S32: No), the process returns to step S31.

<Step S33>

The operating rate determination unit 107 determines whether the number of replacements of replacement part counted by the analysis unit 106 for the printing device 20 is equal to or higher than a predetermined value (second predetermined value). The printing device 20 whose number of replacements of replacement part is equal to or higher than the predetermined value is considered as having decreased work efficiency due to frequent replacements of the replacement part. Based on determination that the number of replacements of replacement part is equal to or higher than the predetermined value (step S33: Yes), the process proceeds to step S34, and based on determination that the number of replacements of replacement part is lower than the predetermined value (step S33: No), the process proceeds to step S36.

<Step S34>

The identification unit 108 of the operation analysis system 10 identifies the print service and the offering model that corresponds to the property of the printing device 20 included in the property information and improves the work efficiency, from the offering model management information, in order to improve the operating rate and work efficiency of the printing device 20 determined by the operating rate determination unit 107 that the number of replacements of replacement part of the printing device 20 is equal to or higher than the predetermined value. Then, the process proceeds to step S35.

<Step S35>

In response to a pressing of the operating rate improvement button 1105 on the printing time summary screen 1100 displayed on the client PC 30, the UI generation unit 109 of the operation analysis system 10 generates screen information of an offering model presentation screen 1200 for proposing the printing service and the offering model identified by the identification unit 108 for improving the operating rate of the target printing device 20 and for improving the work efficiency, and transmits the screen information to the client PC 30 through the communication unit 101. The client PC 30 displays the offering model presentation screen 1200 based on the screen information.

<Step S36>

The identification unit 108 identifies the printing service and the offering model according to the property of the printing device 20 included in the property information from the offering model management information, in order to improve the operating rate of the printing device 20 that has the operating rate determined by the operating rate determination unit 107 to be equal to or lower than the predetermined value. Then, the process proceeds to step S37.

<Step S37>

In response to a pressing of the operating rate improvement button 1105 on the printing time summary screen 1100 displayed on the client PC 30, the UI generation unit 109 generates screen information of an offering model presentation screen 1200 for proposing the printing service and the offering model identified by the identification unit 108 for improving the operating rate of the target printing device 20, and transmits the screen information to the client PC 30 through the communication unit 101. The client PC 30 displays the offering model presentation screen 1200 based on the screen information.

Through steps S31 to S37 described above, the offering model presentation process of the operation analysis system 10 is executed.

As described above, in the operation analysis system 10 according to the present embodiment, the information related to printing includes information on the number of replacements of the replacement part of the printing device 20, the analysis unit 106 obtains the number of replacements of the replacement part from the information on the replacement, the operating rate determination unit 107 determines whether the number of replacements is equal to or higher than the predetermined value (second predetermined value) for the printing device 20 whose operating rate is equal to or lower than the predetermined value (first predetermined value), and the identification unit 108 identifies the offering model of a system configuration that improves the work efficiency of the printing device 20 based on the property of the printing device 20 whose number of replacements is equal to or higher than the predetermined value (second predetermined value). As a result, the operating rate of the printing device 20 owned by the user and the work efficiency is improved.

An information processing system 1 according to a fourth embodiment is described, focusing on points that are different from the information processing system 1 according to the first embodiment. In the first to third embodiments described above, the operation of presenting the identified offering model by the operation analysis systems 10 and 10a is performed through the client PC 30 used by the user. In the present embodiment, in order to effectively propose the offering model to the user from the standpoint of a salesperson or the like, an operation to confirm the reason for selecting the offering model by the operation analysis system and to manage a proposal status is described. The hardware configurations of the operation analysis system, printing device 20, and client PC 30 according to the present embodiment are the same as the configurations described in the first embodiment.

Figure 21:
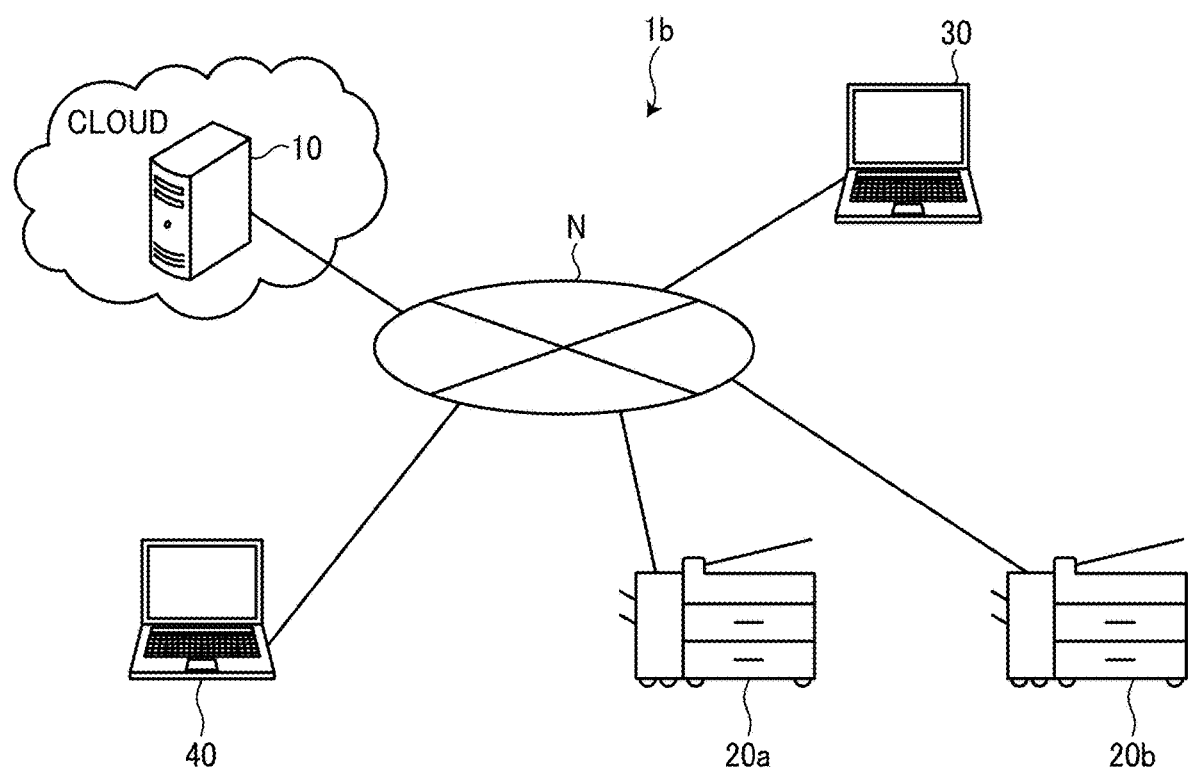
FIG. 21 is a diagram illustrating an example of the overall configuration of the information processing system according to a fourth embodiment.

FIG. 21 is a diagram illustrating an example of the overall configuration of the information processing system according to the fourth embodiment.

The overall configuration of an information processing system 1b according to the present embodiment is described with reference to FIG. 21.

The information processing system 1 illustrated in FIG. 21 is a system for analyzing an operation status of printing device owned by a user such as a company and presents a system configuration that improves operating rate of a printing device as an offering model. As illustrated in FIG. 21, the information processing system 1b includes an operation analysis system 10b, printing devices 20a and 20b, a client PC 30 (an example of a management apparatus), and a service PC 40 (an example of a management apparatus, a service terminal). The systems and devices described above communicate with each other through a network N. The operations of the printing devices 20a and 20b and the client PC 30 are the same as those described in the first embodiment.

The operation analysis system 10b is a web-based system residing on the cloud for analyzing the operation status of printing device owned by the user such as the company and presents a system configuration that improves the operating rate of the printing device as an offering model. The operation analysis system 10b provides the service PC 40 used by the salesperson or the like with various UI information for managing the status of proposals of offering models to users. The operation analysis system 10b is implemented by a single information processing apparatus or a plurality of information processing apparatuses.

The service PC 40 is an information processing apparatus such as a PC, a smartphone, or a tablet terminal owned by the salesperson or the like, for proposing the offering model identified by the operation analysis system 10b based on the operating rate of the printing devices 20a and 20b, for example, to the user who owns the printing devices 20a and 20b. The hardware configuration of the service PC 40 may conform to the configuration illustrated in FIG. 2 described above.

Figures 22, 23:
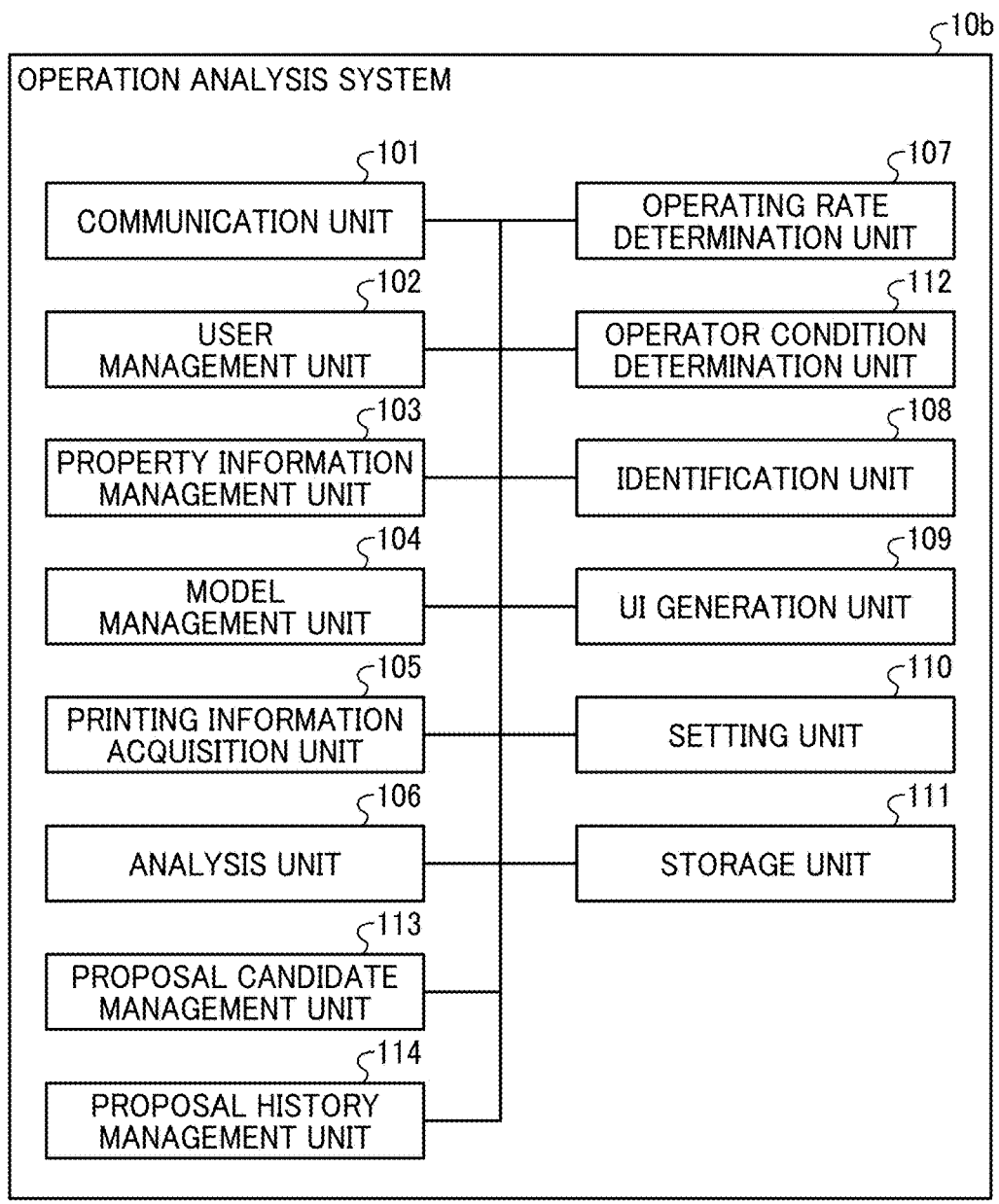
FIG. 22 is a block diagram illustrating an example of a functional configuration of the operation analysis system according to the fourth embodiment.
FIG. 23 is a table illustrating an example of the owned device information.

FIG. 22 is a block diagram illustrating an example of a functional configuration of the operation analysis system according to the fourth embodiment. FIG. 23 is a table illustrating an example of owned device information. FIG. 24 is a diagram illustrating an example of proposal candidate information. FIG. 25 is a diagram illustrating an example of proposal history information. FIG. 26 is a table illustrating an example of offering model management information.

Figure 28:
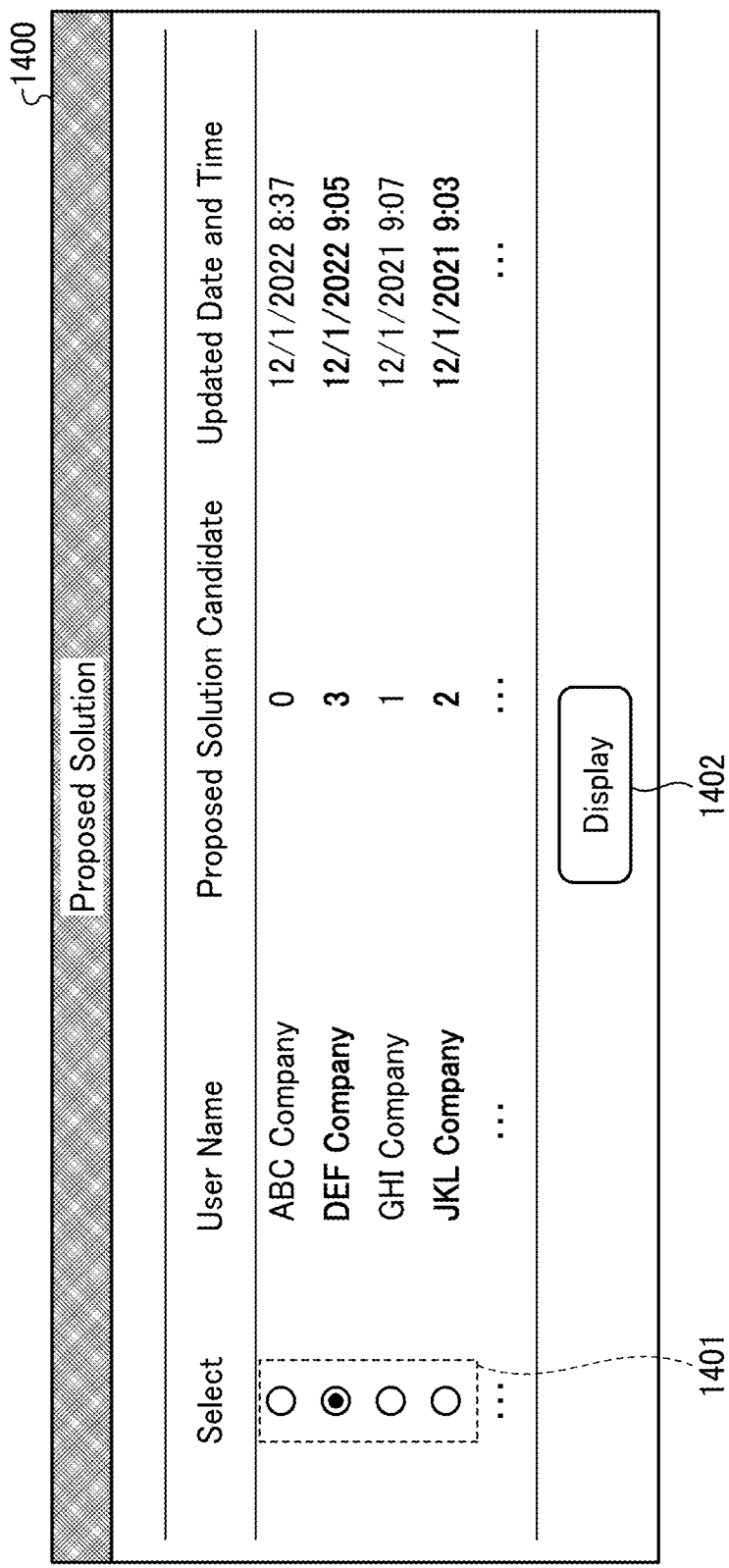
FIG. 28 is a diagram illustrating an example of a proposed solution top screen.
Figure 29:
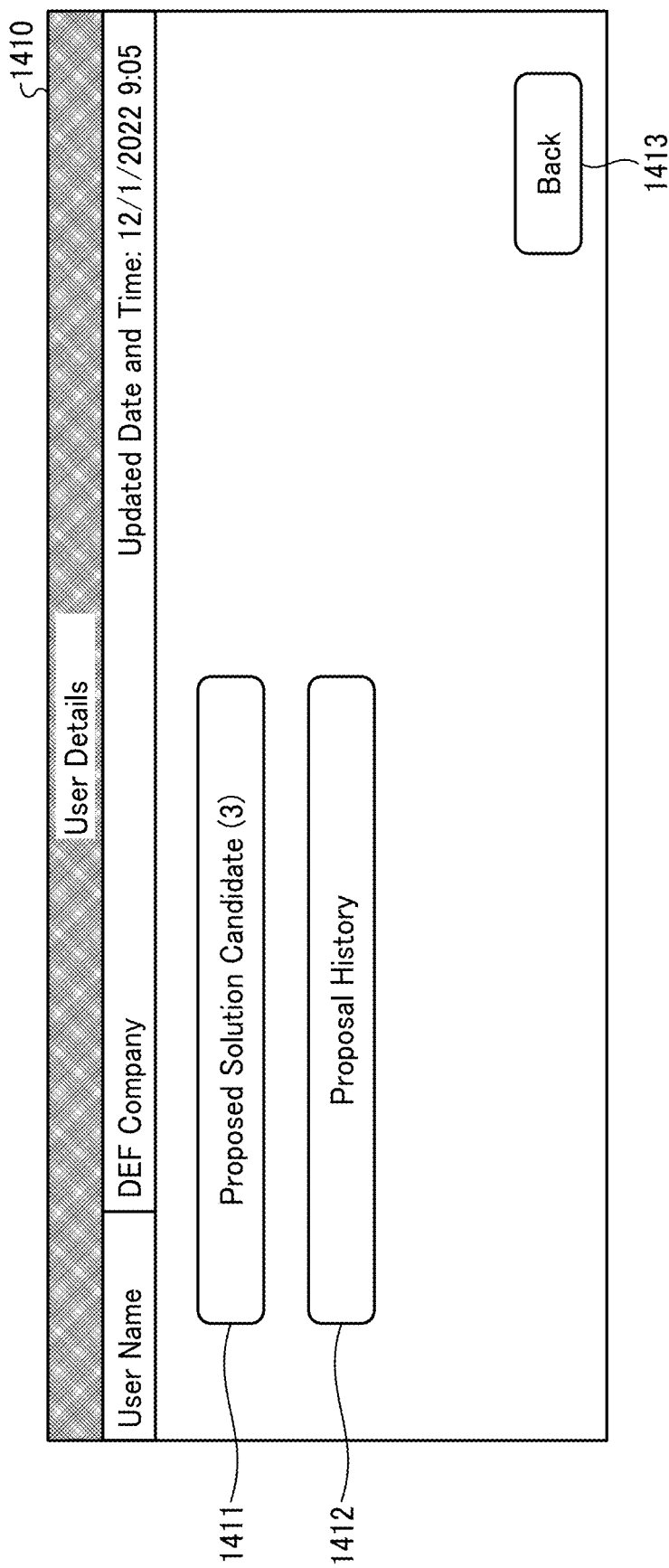
FIG. 29 is a diagram illustrating an example of a user details screen.
Figure 30:
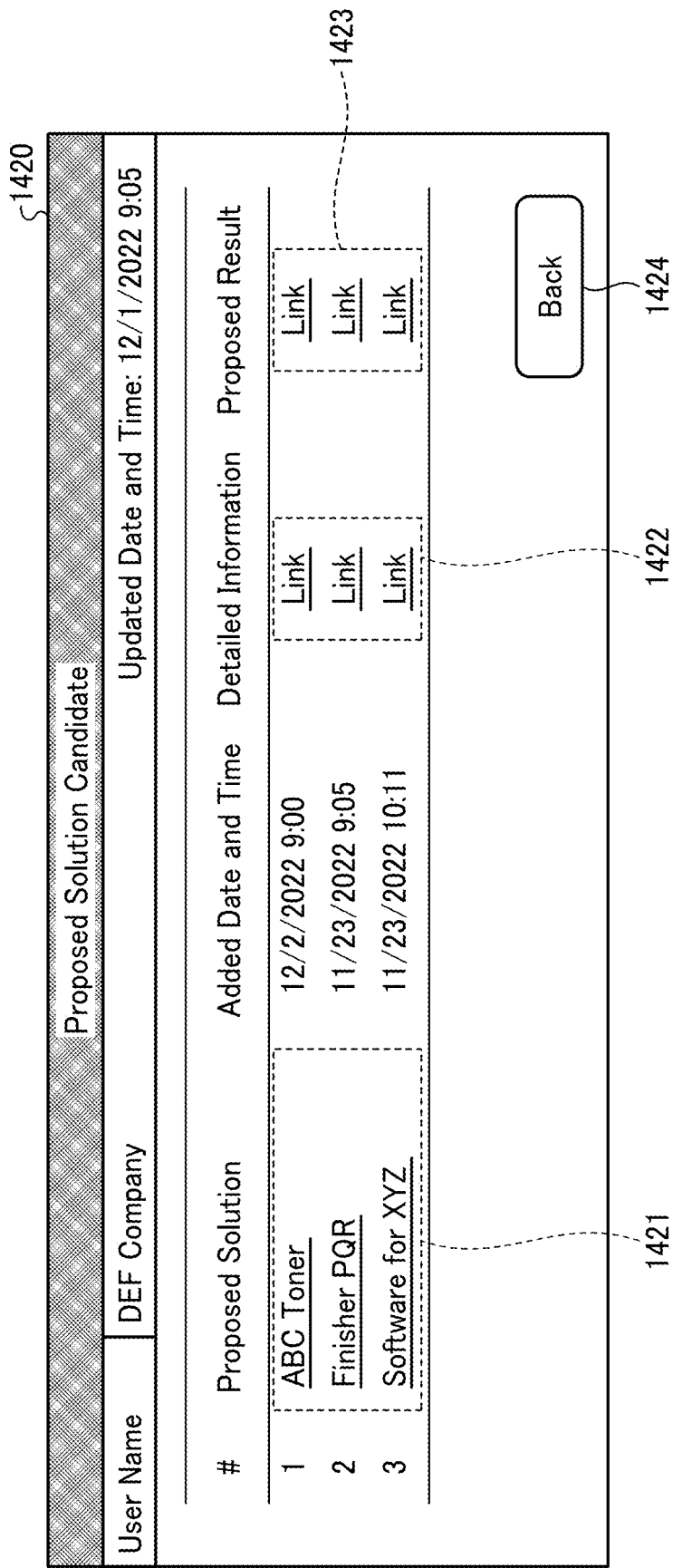
FIG. 30 is a diagram illustrating an example of a proposed solution candidate list screen.
Figure 31:
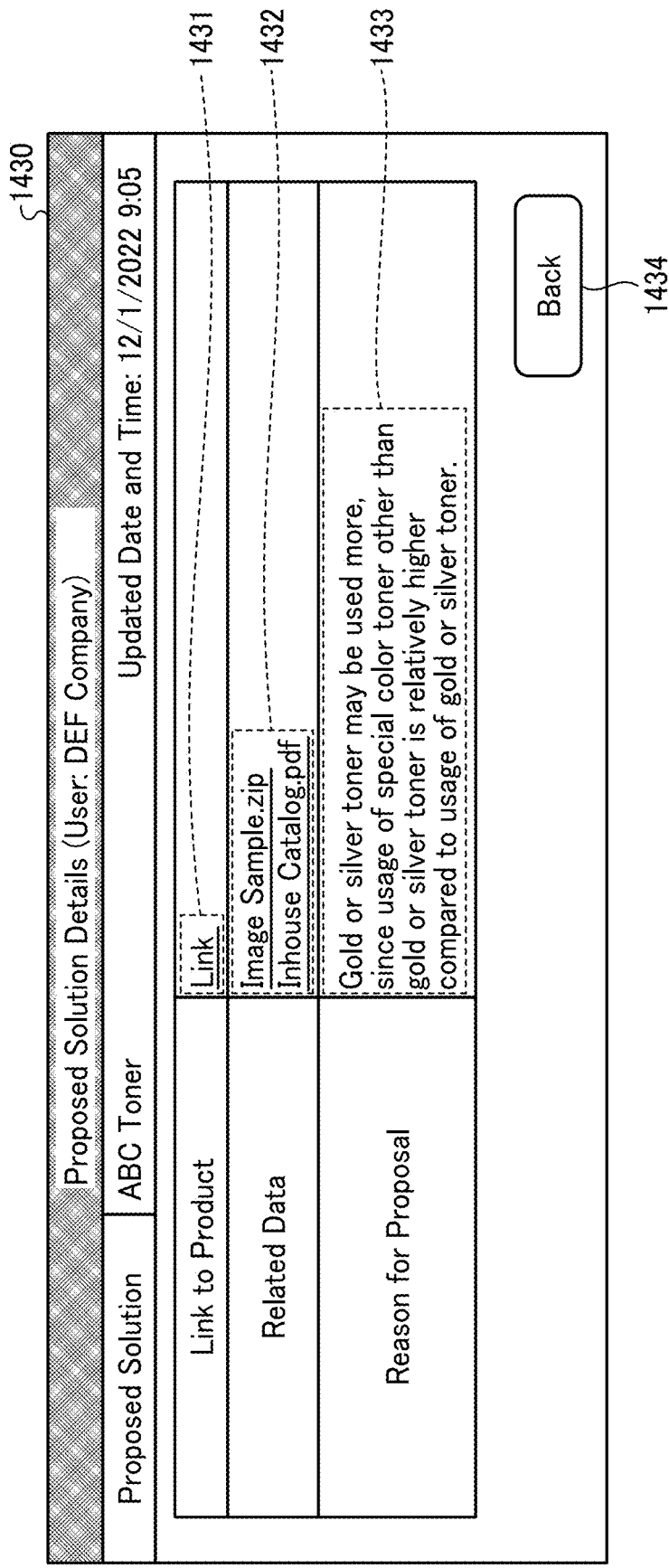
FIG. 31 is a diagram illustrating an example of a proposed solution detailed information screen.
Figure 33:
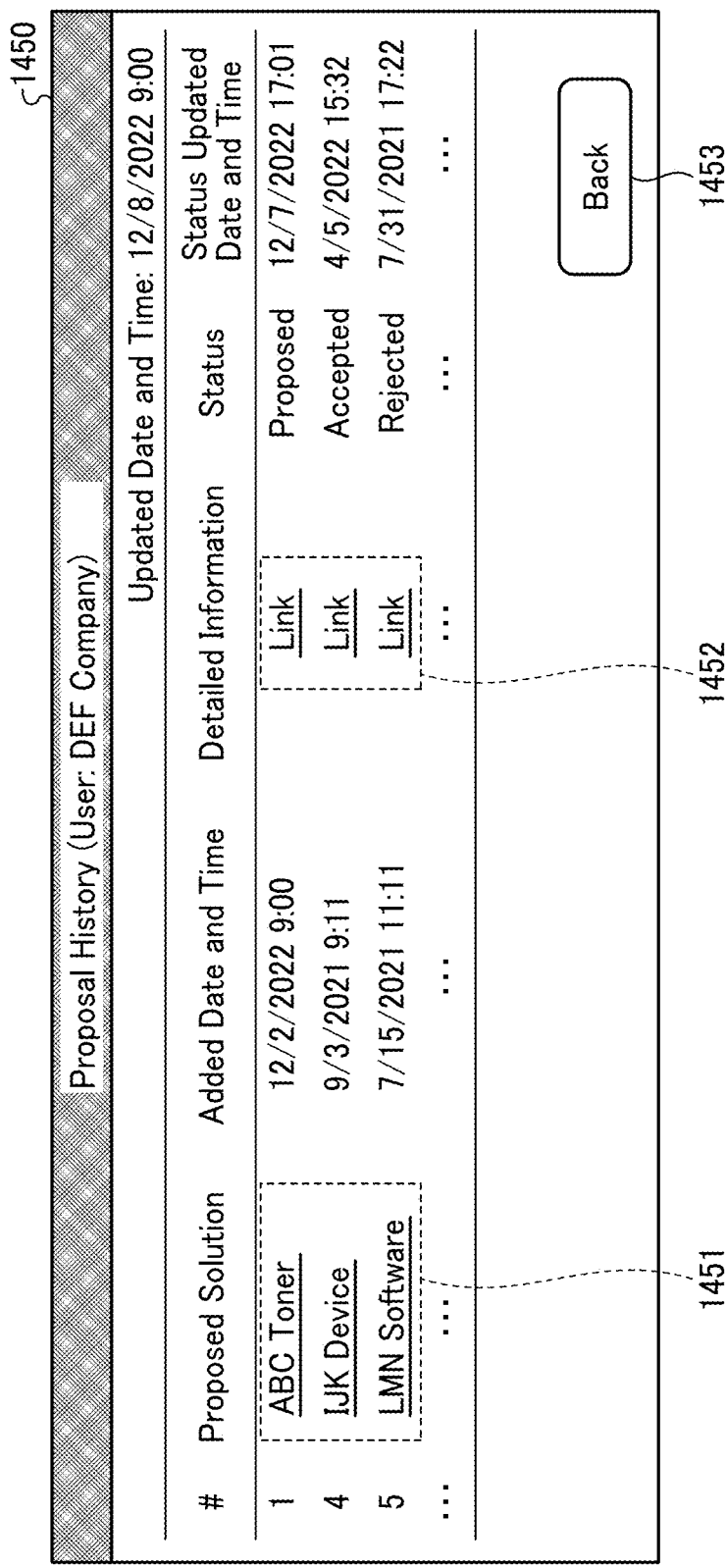
FIG. 33 is a table illustrating an example of a proposal history screen.

FIG. 27 is a diagram illustrating an example of operating rate information of the printing device. FIG. 28 is a diagram illustrating an example of a proposed solution top screen. FIG. 29 is a diagram illustrating an example of a user details screen. FIG. 30 is a diagram illustrating an example of a proposed solution candidate list screen. FIG. 31 is a diagram illustrating an example of a proposed solution detailed information screen. FIG. 32 is a diagram illustrating an example of a proposal result report screen. FIG. 33 is a diagram illustrating an example of a proposal history screen. The configuration and operation of functional blocks of the operation analysis system 10 according to the present embodiment is described with reference to FIGS. 22 to 33.

As illustrated in FIG. 22, the operation analysis system 10b includes the communication unit 101, the user management unit 102, the property information management unit 103 (first management unit), the model management unit 104 (second management unit), the printing Information acquisition unit 105 (acquisition unit), the analysis unit 106, the operating rate determination unit 107 (first determination unit), the identification unit 108, the UI generation unit 109 (generation unit), the setting unit 110, the storage unit 111, the operator condition determination unit 112 (second determination unit), a proposal candidate management unit 113 (third management unit), and a proposal history management unit 114. The operations of the communication unit 101, the property information management unit 103, the printing information acquisition unit 105, and the operating rate determination unit 107 are the same as the description in the first embodiment.

The user management unit 102 manages the ID and model of the printing device 20 owned by the user of a company or the like in association with each printing device 20. For example, the user management unit 102, as illustrated in FIG. 23, stores in the storage unit 111, owned device information associating a user ID that is user identification information, a device ID that is identification information of the printing device 20 owned by the user, a model of the printing device 20, a proposal candidate ID that identifies an offering model that implements a printing service using the printing device 20, and a proposal history ID that identifies proposal status information for the identified offering model. In the owned device information illustrated in FIG. 23, for example, the user ID "CCC," the device ID "C01," the model "model C," the proposal candidate ID "8, 9," and the proposal history ID "9" are associated.

The model management unit 104, as illustrated in FIG. 26, stores in the storage unit 111, offering model management information associating property of the printing device 20 (device property), an operator condition for determining whether the property is provided, a printing service corresponding to the property, and an offering model, which is a system configuration that implements the printing service. In the offering model management information illustrated in FIG. 26, for example, the property (device property) "special color", operator condition "the number of gold or silver toner printing is equal to or lower than a predetermined value, the number of other special color toner printing is equal to or lower than a predetermined value", printing service "ABC Toner", and offering model "system configuration F" are associated. Among the above operator conditions, the predetermined value to be compared with the number of gold or silver toner printing corresponds to the "second predetermined value" of the present disclosure, and the predetermined value to be compared with the number of times of other special color toner printing corresponds to the "third predetermined value" of the present disclosure. The third predetermined value may be previously set, for example, according to the empirical rule and stored in any desired memory. In the above operator conditions, the number of printings is compared with the predetermined value as an example of volume of printing, but the volume of printing is not limited to the number of printings, and a rate of printing within the total volume of printing may be compared with a predetermined value.

The analysis unit 106 performs various analysis on the printing device information acquired by the printing information acquisition unit 105. As examples of the analysis, the analysis unit 106, based on the printing device information, calculates printing time by color of the toner or ink and by paper, calculates the standby time indicating the time in which the printing device is not in operation, and calculates the operating rate that indicates the rate of the printing time to the total time of the printing time and the standby time. Furthermore, based on the printing device information, the analysis unit 106 calculates the number of times a color print job has been executed, the number of times a monochrome print job has been executed, and the number of times a print job using each special color toner has been executed. Here, as examples of the special color toners, clear, white, gold, and silver toners are indicated in FIG. 27. In addition, the analysis unit 106 calculates the printing time, the standby time, the operating rate, the number of color prints, the number of monochrome prints, and the number of printings with each of the special color toners which are clear toner, white toner, gold toner, and silver toner for each day in a certain period.

Then, the analysis unit 106, as illustrated in FIG. 27, generates operating rate information associating the device ID of the printing device 20, date and time of calculation, calculated printing time, calculated standby time, calculated operating rate, calculated number of color prints, number of monochrome prints, and the number of prints with each special color toner, and stores in the storage unit 111. In the operating rate information illustrated in FIG. 27, the device ID "A01" is associated with the date and time "4/1/2022," printing time "4.0," standby time "4.0," operating rate "50," the number of color prints "1000," the number of monochrome prints "2000," the number of special color (clear) toner prints "500," the number of special color (white) toner prints "100," number of the special color (gold) toner prints "10," and number of the special color (silver) toner prints "10."

Based on determination by the operator condition determination unit 112 that the printing device 20 satisfies the operator condition, the identification unit 108 identifies the property of the printing device 20 included in the property information and the printing service and offering model corresponding to the operator condition from the offering model management information in order to improve the operating rate of the printing device 20 and implement a high-quality printing service.

The identification unit 108 identifies the offering model based on determination by the operator condition determination unit 112 as to whether the operator condition is satisfied, indicating as to whether the information corresponding to the printing device 20 in the operating rate information illustrated in FIG. 27 satisfies the operator condition. In this case, a learning model that outputs the printing service and offering model with the operating rate information as an input may be used. In this case, since the operating rate included in the operating rate information is determined by the operating rate determination unit 107, information other than the operating rate included in the operating rate information, for example, may be input to the learning model. As described below, for offering models identified by the learning model based on certain operating rate information, the identification unit 108 may relearn the learning model based on the user reaction to the offering model input by the salesperson as a proposal result report to the user, and the detailed content of the user reaction described by the salesperson. In this case, the text data as the detailed content of the user reaction described by the salesperson may be used for relearning, for example, using a result of processing such as text mining or natural language processing. In the case the identification unit 108 uses the learning model in this way, the learning model may be evaluated based on at least one of the user reaction to the offering model (selection result of reaction selection radio button 1442 illustrated in FIG. 32 described below), or the final result of the proposal of the offering model (selection result of the result selection radio button 1444 illustrated in FIG. 32 described below). For example, a learning model with a user reaction equal to or higher than the predetermined value (good reaction) is used to identify an offering model for another printing device 20, and a learning model with a reaction lower than the predetermined value (bad reaction) is to be improved or temporarily suspended. In addition, a learning model whose introduction decision rate of the final result of offering model proposal is equal to or higher than a predetermined value is used to identify an offering model for another printing device 20, and a learning model whose rate is lower than a predetermined value is to be improved or temporarily suspended. Further, as described above, when the learning model is evaluated, the identification unit 108 may notify an administrator or the like of the operation analysis system 10b. In response to receiving this notification, the administrator can take measures such as deploying the learning model to other printing devices 20, improving the learning model, or suspending the operation of the learning model.

The proposal candidate management unit 113 is a functional unit that manages the offering model identified by the identification unit 108 as a proposal candidate for the user. Specifically, the proposal candidate management unit 113 issues a proposal candidate ID for the offering model at the timing when the offering model for the specific printing device 20 is identified by the identification unit 108, and creates a new record of proposal candidate information illustrated in FIG. 24. As illustrated in FIG. 24, the proposal candidate management unit 113 stores the proposal candidate information that includes the proposal candidate ID, the offering model, the added date and time, the reason identified by the identification unit 108, the user reaction, the reaction details, and the status indicating the proposal status of the offering model in the storage unit 111. Here, the "added date and time" is the date and time when the proposal candidate management unit 113 added the record to the proposal candidate information. Further, the "reason for identification" is text information indicating the reason for identifying the offering model, for example, the operator condition determination unit 112 determined that the operator condition is satisfied. The "reason for identification" is the content displayed in the identified reason display area 1433 of the proposed solution detailed information screen 1430 illustrated in FIG. 31 described below. The "reason for identification" in the proposal candidate information may be added as fixed text information corresponding to the offering model and operator conditions when the proposal candidate management unit 113 adds a record. The "user reaction" is a numerical representation of the reaction of the user when the offering model identified by the identification unit 108 is proposed to the user. The "user reaction" corresponds to the numerical value selected with the reaction selection radio button 1442 of the proposal result report screen 1440 illustrated in FIG. 32 described below. Further, the "details of reaction" is a record of the reaction of the user input by the salesperson when the offering model identified by the identification unit 108 is proposed to the user, and corresponds to the contents input in a detailed input area 1443 of the proposal result report screen 1440 illustrated in FIG. 32 described below. The "status" indicates the status of the proposal to the user of the offering model identified by the identification unit 108. For example, before the proposal of the offering model, the status is "before proposal," when the proposal is under consideration by the user, the status is "proposing," when the proposal is accepted by the user, the status is "accepted," and when the proposal is refused by the user, the status is "refused."

The proposal history management unit 114 is a functional unit for managing the history of proposals made to users by the salesperson regarding the offering model identified by the identification unit 108. Specifically, the proposal history management unit 114 issues a proposal history ID for the offering model and creates a new proposal history information record illustrated in FIG. 25, in response to a pressing of the send button 1445 at the timing that the proposal result is input to the proposal result report screen 1440 illustrated in FIG. 32 described below, after the offering model is identified by the identification unit 108 for the specific printing device 20, and the salesperson proposed the offering model to the user. The proposal history management unit 114, as illustrated in FIG. 25, stores in the storage unit 111, proposal history information associating the proposal history ID, the offering model, date and time (added date and time), a status indicating the status of proposals for the offering model, and the date and time when the status was updated (status update date and time). The "added date and time" is the date and time when the record was added to the proposal history information by the proposal history management unit 114. Also, "status" is the same as "status" described above with reference to FIG. 24.

The proposal history information illustrated in FIG. 25 may include, for example, "user reaction", "reaction details", and the like included in the proposal candidate information illustrated in FIG. 24.

The UI generation unit 109 generates screen information for various screens to be displayed on the client PC 30 and the service PC 40. The UI generation unit 109 transmits screen information of various screens to the client PC 30 or the service PC 40 through the communication unit 101 in response to a request from the client PC 30 or the service PC 40 (for example, designating a URL).

The transmission of screen information of various screens by the UI generation unit 109 may be performed after authentication process by the operation analysis system 10b is performed by a login operation of the client PC 30 or the service PC 40. Further, each screen generated by the UI generation unit 109 to be displayed on the client PC 30 is as described in the above-described first embodiment.

As an example of a screen to be displayed on the service PC 40, the UI generation unit 109 generates screen information for a proposed solution top screen 1400 illustrated in FIG. 28 for displaying a list of the number of proposed solutions for each user, and the like. As illustrated in FIG. 28, the proposed solution top screen 1400 includes each user, the number of proposed solution candidates, and updated date and time as a list, a radio button 1401 and a display button 1402. Here, the proposed solution refers to the print service and offering model identified by the identification unit 108. The number of proposed solution candidates on the proposed solution top screen 1400 indicates the number of proposed solutions identified by the identification unit 108 for one or more printing devices 20 owned by the user displayed in "user name".

The update date and time on the proposed solution top screen 1400 indicates the update date and time when the content of the proposed solution associated with each user or the proposal status or the like is updated. In the case there is an update in the content of the proposed solution associated with each user, or in the status of proposal, etc., compared to the proposed solution top screen 1400 last viewed by the salesperson, the UI generation unit 109 highlights (for example, displays with a thick line or highlights) a part of the list corresponding to the updated information as illustrated in FIG. 28.

The radio button 1401 is a radio button for selecting one of the lists of information on proposed solutions for each user displayed on the proposed solution top screen 1400.

The display button 1402 is a button for displaying a user details screen 1410 illustrated in FIG. 29 for the user selected by the radio button 1401. In response to a pressing of the display button 1402, a request to display the user details screen 1410 for confirming the details of the proposed solution for the user selected by the radio button 1401 is sent from the service PC 40 to the operation analysis system 10b.

In response to the pressing of the display button 1402 of the proposed solution top screen 1400, the UI generation unit 109 generates screen information of the user details screen 1410 for each user illustrated in FIG. 29 and causes the service PC 40 to display the screen.

The user details screen 1410 illustrated in FIG. 29 includes a proposed solution candidate button 1411, a proposal history button 1412, and a back button 1413.

The proposed solution candidate button 1411 is a button for displaying a proposed solution candidate list screen 1420 illustrated in FIG. 30 for displaying a list of proposed solution candidates corresponding to the user. By pressing the proposed solution candidate button 1411, a display request for the proposed solution candidate list screen 1420 is transmitted from the service PC 40 to the operation analysis system 10b.

The proposal history button 1412 is a button for displaying a proposal history screen 1450 illustrated in FIG. 33 for displaying a list of proposal histories of proposed solutions corresponding to the user. By pressing the proposal history button 1412, a request to display the proposal history screen 1450 is transmitted from the service PC 40 to the operation analysis system 10b.

The back button 1413 is a button for returning to the proposed solution top screen 1400.

In response to a pressing of the proposed solution candidate button 1411 on the user details screen 1410, the UI generation unit 109 generates screen information for the proposed solution candidate list screen 1420 illustrated in FIG. 30 and displays the screen on the service PC 40.

The proposed solution candidate list screen 1420 illustrated in FIG. 30 is a screen for displaying a list of proposed solution candidates corresponding to the user selected on the proposed solution top screen 1400 based on the proposal candidate information illustrated in FIG. 24. The proposed solution candidate list screen 1420 includes a proposed solution name link 1421, a detailed information link 1422, a proposal result link 1423, and a back button 1424, as illustrated in FIG. 30.

The proposed solution name link 1421 is a link for displaying a screen illustrating a specific configuration of the corresponding proposed solution's offering model by the clicking (or tapping) operation. The screen illustrating the specific configuration of the offering model of the proposed solution may be, for example, a screen conforming to the offering model presentation screen 1200 illustrated in FIG. 11 described above. By clicking (or tapping) the proposed solution name link 1421, a request for displaying a screen illustrating a specific configuration of the offering model of the proposed solution is sent from the service PC 40 to the operation analysis system 10b.

The detailed information link 1422 is a link for displaying a proposed solution detailed information screen 1430 illustrated in FIG. 31 for displaying detailed information of the corresponding proposed solution by a clicking (or tapping) operation. By clicking (or tapping) the detailed information link 1422, a request for displaying the proposed solution detailed information screen 1430 is sent from the service PC 40 to the operation analysis system 10b.

The proposal result link 1423 is a link for displaying the proposal result report screen 1440 illustrated in FIG. 32 for reporting the proposal result of the corresponding proposed solution by the clicking (or tapping) operation. By clicking (tapping) the proposal result link 1423, a request to display the proposal result report screen 1440 is transmitted from the service PC 40 to the operation analysis system 10b.

The back button 1424 is a button for returning to the user details screen 1410.

In response to a clicking of the detailed information link 1422 of the proposed solution candidate list screen 1420, the UI generation unit 109 generates screen information of the proposed solution detailed information screen 1430 (an example of the first screen) illustrated in FIG. 31 and causes the service PC 40 to display the screen.

The proposed solution detailed information screen 1430 illustrated in FIG. 31 is a screen for displaying the details of the proposed solution selected in the proposed solution candidate list screen 1420 based on the proposal candidate information illustrated in FIG. 24. The proposed solution detailed information screen 1430 includes a product link 1431, a related data link 1432, an identified reason display area 1433, and a back button 1434, as illustrated in FIG. 31.

The product link 1431 is a link for displaying a screen presenting a specific configuration of the corresponding offering model of the proposed solution by the clicking (or tapping) operation. The screen illustrating the specific configuration of the offering model of the proposed solution may be, for example, a screen conforming to the offering model presentation screen 1200 illustrated in FIG. 11 described above. By clicking (or tapping) the product link 1431, a request for displaying a screen illustrating a specific configuration of the offering model of the proposed solution is sent from the service PC 40 to the operation analysis system 10b.

A related data link 1432 is clicked (or tapped) to display an image sample using the proposed solution ("ABC toner" in the example of FIG. 31) selected on the proposed solution candidate list screen 1420, or to download an in-house catalog, or the like.

The identified reason display area 1433 is a display area for displaying the reason for selecting the proposed solution identified by the identification unit 108. Specifically, when generating the screen information of the proposed solution detailed information screen 1430, the UI generation unit 109 refers to the proposal candidate information illustrated in FIG. 24 and the "identified reason" corresponding to the corresponding proposed solution is extracted and displayed in the identified reason display area 1433. In the example illustrated in FIG. 31, the operator condition "the number of prints using gold or silver toner is equal to or smaller than a predetermined value and the number of prints using other special color toner is equal to or larger than a predetermined value" is satisfied, and the offering model "system configuration F" is identified in the offering model management information illustrated in FIG. 26, and as a result, contents in the identified reason display area 1433 illustrated in FIG. 31 are displayed.

The back button 1434 is a button for returning to the proposed solution candidate list screen 1420.

In response to a clicking of the proposal result link 1423 of the proposed solution candidate list screen 1420, the UI generation unit 109 generates the screen information of the proposal result report screen 1440 (an example of the second screen) illustrated in FIG. 32 and causes the service PC 40 to display the screen.

The proposal result report screen 1440 illustrated in FIG. 32 is a screen for transmitting a result of proposal to the user of the proposed solution selected on the proposed solution candidate list screen 1420 to the operation analysis system 10b. The proposal result report screen 1440, as illustrated in FIG. 32 includes a proposal date input area 1441, a reaction selection radio button 1442, a details input area 1443, a result selection radio button 1444, a send button 1445, a temporary save button 1446 and a back button 1447. Note that the selection content of the reaction selection radio button 1442 and the input content of the detailed input area 1443 are examples of "reaction information" of the present disclosure.

The proposal date input area 1441 is an area for inputting the date when the proposed solution was proposed to the user.

The reaction selection radio button 1442 is a radio button for selecting the user reaction to the proposed solution. In the example illustrated in FIG. 32, the user reaction is selected in five stages from 1 (bad) to 5 (good).

The details input area 1443 is an area for the salesperson to input in a free format as a record of the user reaction to the proposed solution.

The result selection radio button 1444 is a radio button for selecting the result of proposing the proposed solution to the user. In the example illustrated in FIG. 32, any one of "accepted", "proposed", and "rejected" is to be selected.

The send button 1445 is a button for sending the contents of the proposal date input area 1441, reaction selection radio button 1442, details input area 1443, and result selection radio button 1444 to the operation analysis system 10b as a proposal result. In response to receiving the above proposal result by the operation analysis system 10b (communication unit 101) by the salesperson pressing the send button 1445, the proposal history management unit 114 issues the proposal history ID for the proposed solution, and newly creates a record of proposal history information illustrated in FIG. 25. Then, the proposal history management unit 114 registers in association with the proposal history ID, the target offering model, the date and time of record addition, the result (status) selected by the result selection radio button 1444, and the date and time when the result was updated.

Further, in response to receiving by the communication unit 101 of the result "accepted" or "rejected" selected by the result selection radio button 1444, the proposal candidate management unit 113 deletes the record of the target offering model from the proposal candidate information illustrated in FIG. 24. As a result, the proposed solution information corresponding to the offering model deleted from the proposal candidate information is no longer displayed on the proposed solution candidate list screen 1420. On the other hand, in the case the result selected by result selection radio button 1444 in the proposal result received by communication unit 101 is "proposed," the proposal candidate management unit 113 registers the content selected with the reaction selection radio button 1442 and the content entered in the details input area 1443 for the "user reaction" and "reaction details" corresponding to the target offering model in the proposal candidate information illustrated in FIG. 24, and updates the "status" to "proposing." As a result, the record of the target offering model remains from the proposal candidate information illustrated in FIG. 24, and the information of the proposed solution corresponding to the target offering model is displayed continuously on the proposed solution candidate list screen 1420 as well.

The temporary save button 1446 is a button for temporarily storing in the storage unit 111 the contents entered and selected in the proposal date input area 1441, the reaction selection radio button 1442, the details input area 1443, and the result selection radio button 1444.

The back button 1447 is a button for returning to the proposed solution candidate list screen 1420.

In response to a pressing of the proposal history button 1412 on the user details screen 1410 for each user, the UI generation unit 109 generates screen information of the proposal history screen 1450 (an example of the third screen) illustrated in FIG. 33 and displays the screen on the service PC 40.

A proposal history screen 1450 illustrated in FIG. 33 displays the proposal history (proposed solution name, date and time of addition, detailed information, status, date and time of status update) of the proposed solution corresponding to the user selected on the proposed solution top screen 1400 based on the proposal history information illustrated in FIG. 25. The proposal history screen 1450 includes a proposed solution name link 1451, a detailed information link 1452, and a back button 1453, as illustrated in FIG. 33.

The proposed solution name link 1451 is a link for displaying a screen illustrating a specific configuration of the corresponding proposed solution's offering model by the clicking (or tapping) operation. The screen illustrating the specific configuration of the offering model of the proposed solution may be, for example, a screen conforming to the offering model presentation screen 1200 illustrated in FIG. 11 described above. By clicking (or tapping) the proposed solution name link 1451, a request for displaying a screen illustrating a specific configuration of the offering model of the proposed solution is sent from the service PC 40 to the operation analysis system 10b.

The detailed information link 1452 is a link for displaying a proposed solution detailed information screen 1430 illustrated in FIG. 31 that displays detailed information of the corresponding proposed solution by the clicking (or tapping) operation. By clicking (or tapping) the detailed information link 1452, a request for displaying the proposed solution detailed information screen 1430 is sent from the service PC 40 to the operation analysis system 10b.

The back button 1453 is a button for returning to the user details screen 1410.

The offering model of each proposed solution displayed on the service PC 40 is identified by the identification unit 108 in the same procedure as the screen displayed on the client PC 30 described in the second embodiment.

The user management unit 102, the property information management unit 103, the model management unit 104, the printing information acquisition unit 105, the analysis unit 106, the operating rate determination unit 107, the operator condition determination unit 112, the identification unit 108, the UI generation unit 109, the setting unit 110, the proposal candidate management unit 113, and the proposal history management unit 114 described above are implemented by executing programs by CPU 501 illustrated in FIG. 2. Note that the functional units described above are not limited to be implemented by executing programs by the CPU 501 in FIG. 2, but, for example, the functional units may be implemented by hardware such as an integrated circuit, or may be implemented by using the software and hardware together.

Further, each functional unit of the operation analysis system 10b illustrated in FIG. 22 conceptually represents a function and configuration is not limited to the diagram illustrated in FIG. 22. For example, a plurality of functional units illustrated as independent functional units of the operation analysis system 10b in FIG. 22 may be configured as one functional unit. On the other hand, the function of one functional unit of the operation analysis system 10b in FIG. 22 may be divided into a plurality of functional units.

Figure 34:
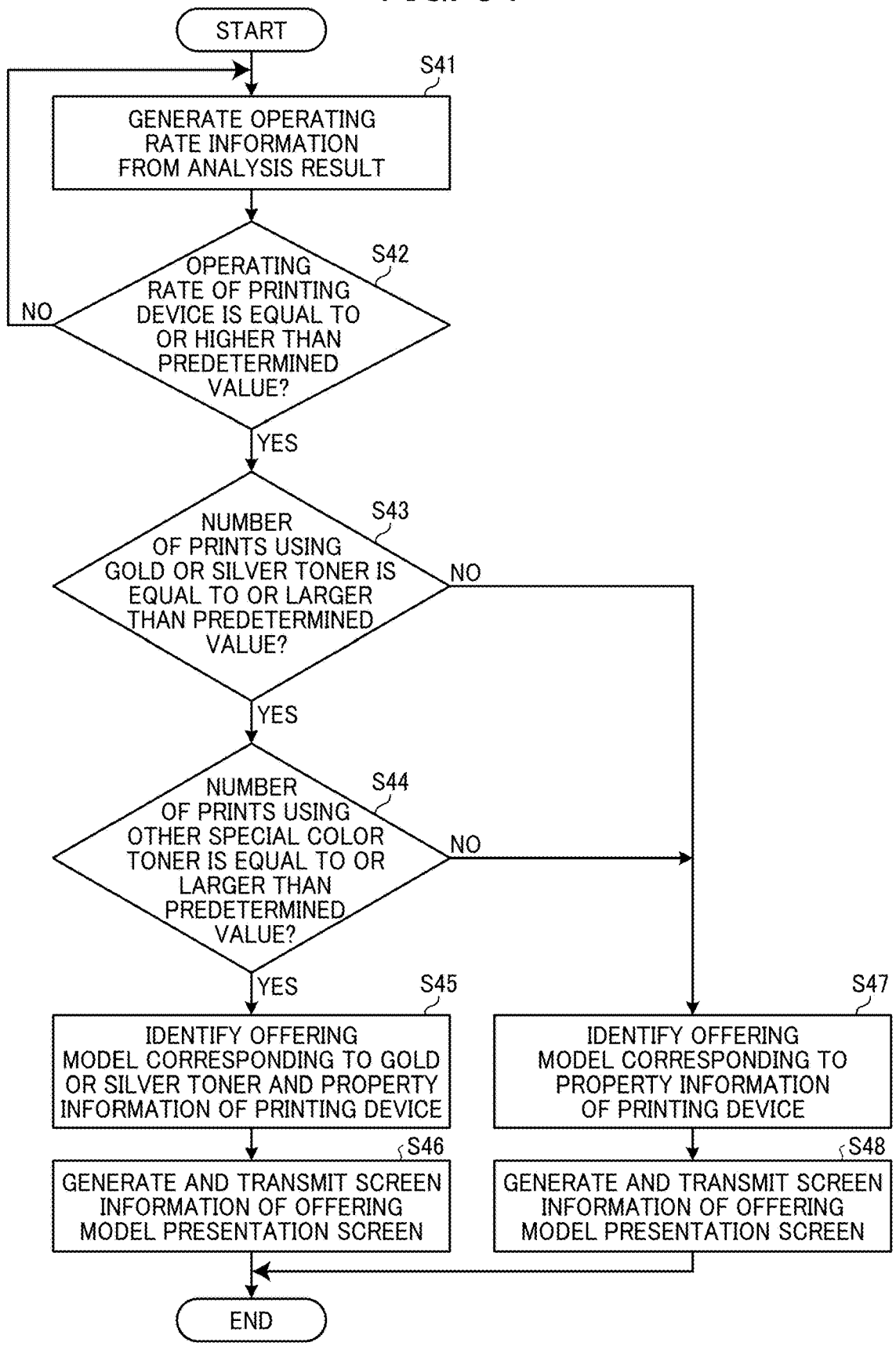
FIG. 34 is a flowchart illustrating an example of an offering model presentation process of the operation analysis system according to the fourth embodiment.

FIG. 34 is a flowchart illustrating an example of an offering model presentation process of the operation analysis system according to the fourth embodiment. The offering model presentation process of the operation analysis system 10b according to the present embodiment is described with reference to FIG. 34.

<Step S41>

The printing information acquisition unit 105 of the operation analysis system 10b acquires printing device information from each printing device 20 each time a job is executed by each printing device 20 or at predetermined intervals (for example, once a day). The analysis unit 106 of the operation analysis system 10b performs various analysis on the printing device information acquired by the printing information acquisition unit 105. As examples of the analysis, the analysis unit 106, based on the printing device information, calculates printing time by color of the toner or ink, and by type of paper, calculates the standby time indicating the time in which the printing device is not in operation, and calculates the operating rate that indicates the rate of the printing time to the total time of the printing time and the standby time. Furthermore, based on the printing device information, the analysis unit 106 calculates the number of times a color print job has been executed, the number of times a monochrome print job has been executed, and the number of times a print job using each special color toner has been executed. In addition, the analysis unit 106 calculates the printing time, the standby time, the operating rate, the number of color prints, the number of monochrome prints, and the number of prints with each of the special color toners which are clear toner, white toner, gold toner, and silver toner for each day in a certain period. Then, the analysis unit 106, as illustrated in FIG. 27, generates operating rate information associating the device ID of the printing device 20, date and time of calculation, calculated printing time, calculated standby time, calculated operating rate, calculated number of color prints, number of monochrome prints, and the number of prints with each special color toner, and stores in the storage unit 111. Then, the process proceeds to step S42.

<Step S42>

The operating rate determination unit 107 of the operation analysis system 10b determines whether the operating rate calculated by the analysis unit 106 for each printing device 20 is equal to or lower than a predetermined value. Based on determination that the operating rate is equal to or lower than the predetermined value (step S42: Yes), the printing device 20 is identified as a target for presenting an offering model for improving the operating rate, and the process proceeds to step S43. Based on a determination that the operating rate is not equal to or lower than the predetermined value (step S42: No), the process returns to step S41.

<Step S43>

The operator condition determination unit 112 of the operation analysis system 10b determines whether an operator condition corresponding to the property (device property) of the printing device 20 in the offering model management information is satisfied for the printing device 20 for which the operating rate determination unit 107 has determined that the operating rate is equal to or lower than the predetermined value. The operator conditions are assumed to be whether the number of gold or silver toner prints is equal to or lower than a predetermined value and whether the number of other special color toner prints is equal to or higher than a predetermined value as indicated in the offering model management information illustrated in FIG. 26. In the case the number of gold or silver toner prints among the operator conditions is equal to or lower than the predetermined value (step S43: Yes), the process proceeds to step S44, and in the case the number of gold or silver toner prints exceeds the predetermined value (step S43: No), the process proceeds to step S47.

<Step S44>

In the case the number of other special color toner prints is equal to or larger than the predetermined value (step S44: Yes), the process proceeds to step S45, and in the case the number of other special color toner prints is smaller than the predetermined value (step S44: No), the process proceeds to step S47.

<Step S45>

The identification unit 108 of the operation analysis system 10b identifies the property of the printing device 20 included in the property information and the printing service and offering model corresponding to gold or silver toner from the offering model management information in order to improve the operating rate and to implement a high-quality printing service of the printing device 20 determined by the operator condition determination unit 112 to satisfy the operator condition. In other words, for a user who uses gold or silver toner, which is a special color to some extent but uses a large amount of toner of other special colors (for example, clear, white, etc.) for printing, the above operator conditions are set based on the expectation that a printing service using gold or silver toner ("ABC toner" illustrated in FIG. 26) and an offering model ("system configuration F" illustrated in FIG. 26) are likely to be adopted. Then, the process proceeds to step S46.

<Step S46>

In response to a pressing of the operating rate improvement button 1105 on the printing time summary screen 1100 displayed on the client PC 30 (or the service PC 40), the UI generation unit 109 of the operation analysis system 10 generates screen information for an offering model presentation screen 1200 for proposing the printing service and the offering model identified by the identification unit 108 for improving the operating rate of the target printing device 20, and transmits the screen information to the client PC 30 (or the service PC 40) through the communication unit 101. The client PC 30 or the service PC 40 displays the offering model presentation screen 1200 based on the screen information.

<Step S47>

The identification unit 108 identifies a printing service and an offering model according to the property of the printing device 20 included in the property information from the offering model management information, in order to improve the operating rate of the printing device 20 that has the operating rate equal to or lower than the predetermined value as determined by the operating rate determination unit 107. Then, the process proceeds to step S48.

<Step S48>

In response to a pressing of an operating rate improvement button 1105 on the printing time summary screen 1100 displayed on the client PC 30 or the service PC 40, the UI generation unit 109 generates screen information of an offering model presentation screen 1200 for proposing a printing service and an offering model identified by the identification unit 108 for improving the operating rate of the target printing device 20, and transmits the screen information to the client PC 30 or the service PC 40 through the communication unit 101. The client PC 30 or the service PC 40 displays the offering model presentation screen 1200 based on the screen information.

Through steps S41 to S48 described above, the offering model presentation process of the operation analysis system 10*b* is executed.

As described above, in the operation analysis system 10*b* according to the present embodiment, the operator condition determination unit 112 determines whether the number of gold or silver toner prints is equal to or smaller than the predetermined value, and whether the number of other special color toner prints is equal to or larger than the predetermined value, as the operator condition. As a result, for a user who uses gold or silver toner, which is a special color to some extent, but uses a large amount of toner of other special colors (for example, clear, white, etc.) for printing, printing services and offering models that use gold or silver toners are likely to be adopted.

Further, in the operation analysis system 10*b* according to the present embodiment, the proposal candidate management unit 113 manages the proposal candidate information, associating at least the offering model identified by the identification unit 108, a reason for identifying the offering model, reaction information (for example, "user reaction" and "reaction details") regarding reaction of the user to the proposal of the offering model, and status indicating status of the proposal of the offering model, and the UI generation unit 109 generates at least the screen information of the proposed solution detailed information screen 1430 displaying the reason for identifying the proposal candidate information by the identification unit 108 to be displayed on the service PC 40. The salesperson is able to confirm the reason for the identification unit 108 to identify the offering model of the proposed solution on the service PC 40, and then propose the solution to the user, which leads to improvement of the effectiveness of the proposal.

Further, in the operation analysis system 10*b* according to the present embodiment, the UI generation unit 109 generates screen information for a proposal result report screen 1440 that allows at least input of reaction information (for example, "user reaction" and "reaction details") and a result of the proposal of the offering model identified by the identification unit 108, to be displayed by the service PC 40, and the proposal candidate management unit 113 registers the reaction information and proposal results input through the proposal result report screen 1440 displayed on the service PC 40, in the reaction information and status corresponding to the offering model in the proposal candidate information. The reaction of the user to the proposal is recorded and can be checked in the next proposal to improve the effectiveness of the proposal.

Further, in the operation analysis system 10*b* according to the present embodiment, the identification unit 108 inputs at least a part of the information related to printing into the learning model, identifies an offering model based on the output from the learning model, and causes the learning model to relearn using the reaction information input through the proposal result report screen 1440. As a result, accuracy of identifying an appropriate offering model according to a printing status of the printing device 20 owned by the user is improved.

Further, the programs executed by the operation analysis system 10, the printing device 20, and the client PC 30 of each of the above-described embodiments may be configured so as to be preinstalled in a ROM or the like and provided.

In addition, the programs executed by the operation analysis systems 10, 10*a*, 10*b*, the printing device 20, the client PC 30, and the service PC 40 of each of the above-described embodiments may be recorded as installable or executable files on a computer-readable recording medium such as a Compact Disc Read Only Memory (CD-ROM), flexible disk (FD), Compact Disc-Recordable (CD-R), Digital Versatile Disc (DVD), etc. and may be configured and provided as a computer program product.

Further, the programs executed by the operation analysis systems 10, 10*a*, and 10*b*, the printing device 20, the client PC 30, and the service PC 40 of each of the above-described embodiment may be configured to be stored on a computer connected to a network such as the internet, and provided by being downloaded through the network. Further, the programs executed by the operation analysis systems 10, 10*a*, 10*b*, the printing device 20, the client PC 30, and the service PC 40 of the above embodiments may be provided or distributed through a network such as the internet.

In addition, the programs executed by the operation analysis systems 10, 10*a*, 10*b*, the printing device 20, the client PC 30, and the service PC 40 of each of the above-described embodiments have a module configuration including each of the above-described functional units, and in terms of hardware, a CPU (processor) reads a program from a ROM and executes the program, thereby loading each of the functional units described above onto a main memory and creating each functional unit on the main memory.

Aspects of the present disclosure are, for example, as follows.

According to a first aspect, an operation analysis system includes an acquisition unit for acquiring information related to printing from a printing device, an analysis unit for calculating an operating rate of the printing device based on the information related to printing, a first determination unit for determining whether the operating rate is equal to or lower than a first predetermined value, an identification unit for identifying a system configuration model that improves the operating rate of the printing device based on a property of the printing device that has operating rate equal to or lower than the first predetermined value, and a generation unit for generating screen information of a presentation screen for presenting the system configuration model.

According to a second aspect, in the operation analysis system of the first aspect, the analysis unit acquires job type information from the information related to printing, the operation analysis system further includes a second determination unit for determining whether printing capability of the printing device that has the operating rate equal to or lower than the first predetermined value satisfies a predetermined condition based on the job type information, and the identification unit identifies the system configuration model corresponding to the property and the printing capability of the printing device that satisfies the predetermined condition.

According to a third aspect, in the operation analysis system of the second aspect, the second determination unit determines whether volume of prints using gold or silver toner is equal to or smaller than a second predetermined value and whether volume of prints using special color toner other than the gold or silver toner is equal to or larger than a third predetermined value, as the predetermined condition.

According to a fourth aspect, in the operation analysis system of the first aspect, the information related to printing includes information on replacement of a replacement part of the printing device, the analysis unit acquires a number of replacements of the replacement part from the information on the replacement, the first determination unit determines whether the number of replacements is equal to or larger than a second predetermined value for the printing device that has the operating rate equal to or lower than the first predetermined value, and the identification unit identifies the system configuration model for improving work efficiency of the printing device based on the property of the printing device that has the number of replacements equal to or larger than the second predetermined value.

According to a fifth aspect, in the operation analysis system of any one of the first aspect to the fourth aspect, the operation analysis system further includes a setting unit for setting a target period of analysis according to an operation on a management device, and the analysis unit calculates the operating rate within the target period, from the information related to printing.

According to a sixth aspect, in the operation analysis system of any one of the first aspect to the fifth aspect, the operation analysis system further includes a first management unit for managing property information indicating property by model of the printing device, and the identification unit identifies the system configuration model based on the property indicated by the property information corresponding to the model of the printing device that has operating rate equal to or lower than the first predetermined value.

According to a seventh aspect, in the operation analysis system of any one of the first aspect to the sixth aspect, the operation analysis system further includes a second management unit for managing model management information indicating a system configuration model corresponding to each property of the printing device, and the identification unit identifies, as the system configuration model for improving the operating rate of the printing device, a system configuration model according to the property of the printing device that has the operating rate equal to or lower than the first predetermined value, indicated by the model management information.

According to an eighth aspect, in the operation analysis system of any one of the first aspect to the seventh aspect, the identification unit identifies the system configuration model that improves the operating rate of the printing device and implements a predetermined printing service.

According to a ninth aspect, in the operation analysis system of any one of the first aspect to the eighth aspect, the printing device is a commercial printing device, and the identification unit identifies a system configuration model that improves the operating rate of the commercial printing device installed in a factory.

According to a tenth aspect, in the operation analysis system of any one of the first aspect to the ninth aspect, the operation analysis system further includes a third management unit for managing proposal candidate information associating at least the system configuration model identified by the identification unit, a reason for identifying the system configuration model, reaction information indicating reaction of a user to a proposal of the system configuration model, and a status indicating a proposal status of the system configuration model, and the generation unit generates screen information of a first screen including at least the reason for identification of the proposal candidate information, to be displayed on a service terminal.

According to an eleventh aspect, in the operation analysis system of the tenth aspect, the generation unit generates screen information of a second screen for receiving input of at least the reaction information and a proposal result of a target system configuration model that is the system configuration model identified by the identification unit, to be displayed on the service terminal, and the third management unit receives the reaction information and the proposal result input through the second screen displayed on the service terminal, and registers respectively in the reaction information and the status corresponding to the target system configuration model in the proposal candidate information.

According to a twelfth aspect, in the operation analysis system of the tenth aspect, the generation unit generates screen information of a third screen for displaying at least information related to the system configuration model identified by the identification unit and a status indicating a proposal status of the system configuration model, to be displayed on the service terminal.

According to a thirteenth aspect, in the operation analysis system of the eleventh aspect, the identification unit inputs at least a part of the information related to printing into a learning model, identifies the system configuration model based on output from the learning model, and causes the learning model to relearn using the reaction information input through the second screen.

According to a fourteenth aspect, an operation analysis apparatus includes an acquisition unit for acquiring information related to printing from a printing device, an analysis unit for calculating an operating rate of the printing device from the information related to printing, a first determination unit for determining whether the operating rate is equal to or lower than a first predetermined value, an identification unit for identifying a system configuration model that improves the operating rate of the printing device based on a property of the printing device that has operating rate equal to or lower than a first predetermined value, and a generation unit for generating screen information of a presentation screen for presenting the system configuration model.

According to a fifteenth aspect, an operation analysis method includes an acquisition step for acquiring information related to printing from a printing device, an analysis step for calculating an operating rate of the printing device from the information related to printing, a determination step for determining whether the operating rate is equal to or lower than a first predetermined value, an identification step for identifying a system configuration model that improves the operating rate of the printing device based on a property of the printing device that has operating rate equal to or lower than a first predetermined value, and a generation step for generating screen information of a presentation screen for presenting the system configuration model.

According to a sixteenth aspect, a program to cause a general computer to perform an acquisition step for acquiring information related to printing from a printing device, an analysis step for calculating an operating rate of the printing device from the information related to printing, a determination step for determining whether the operating rate is equal to or lower than a first predetermined value, an identification step for identifying a system configuration model that improves the operating rate of the printing device based on a property of the printing device that has operating rate equal to or lower than the first predetermined value, and a generation step for generating screen information of a presentation screen for presenting the system configuration model.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An operation analysis system comprising:
circuitry configured to:
acquire information related to printing from a printing device;
calculate an operating rate of the printing device based on the information related to printing;
determine whether the operating rate is equal to or lower than a first predetermined value;
identify a system configuration model for improving the operating rate of the printing device that has the operating rate equal to or lower than the first predetermined value, based on a property of the printing device;
generate screen information of a presentation screen for presenting the system configuration model;
acquire job type information from the information related to printing;
determine whether printing capability of the printing device that has the operating rate equal to or lower than the first predetermined value satisfies a predetermined condition based on the job type information;
identify the system configuration model corresponding to the property and the printing capability of the printing device that satisfies the predetermined condition; and
determine, as the predetermined condition, whether volume of prints using gold toner or silver toner is equal to or smaller than a second predetermined value, and whether volume of prints using special color toner other than the gold toner or silver toner is equal to or larger than a third predetermined value.

2. The operation analysis system of claim 1, wherein
the information related to printing includes information on replacement of a replacement part of the printing device; and
the circuitry is further configured to:
acquire a number of replacements of the replacement part from the information on replacement;
determine whether the number of replacements is equal to or larger than a second predetermined value for the printing device that has the operating rate equal to or lower than the first predetermined value; and
identify the system configuration model for improving work efficiency of the printing device based on the property of the printing device that has the number of replacements equal to or larger than the second predetermined value.

3. The operation analysis system of claim 1, wherein
the circuitry is further configured to:
set a target period of analysis according to an operation on a management device; and
calculate the operating rate within the target period, from the information related to printing.

4. The operation analysis system of claim 1, wherein
the circuitry is further configured to:
manage property information indicating property by model of the printing device, and
identify the system configuration model based on the property indicated by the property information corresponding to the model of the printing device that has the operating rate equal to or lower than the first predetermined value.

5. The operation analysis system of claim 1, wherein
the circuitry is further configured to:
manage model management information indicating a system configuration model corresponding to each property of the printing device; and
identify, as the system configuration model for improving the operating rate of the printing device, the system configuration model according to the property of the printing device that has the operating rate equal to or lower than the first predetermined value, indicated by the model management information.

6. The operation analysis system of claim 1, wherein
the circuitry is further configured to identify the system configuration model that improves the operating rate of the printing device and implements a predetermined printing service.

7. The operation analysis system of claim 1, wherein
the printing device is a commercial printing device, and the circuitry is configured to identify the system configuration model that improves the operating rate of the commercial printing device installed in a factory.

8. The operation analysis system of claim 1, wherein
the circuitry is further configured to
manage proposal candidate information associating at least the identified system configuration model, a reason for identifying the system configuration model, reaction information indicating reaction of a user to a proposal of the system configuration model, and a status indicating a proposal status of the system configuration model, and
generate screen information of a first screen including at least the reason for identification of the proposal candidate information, to be displayed at a service terminal.

9. The operation analysis system of claim 8, wherein the circuitry is further configured to:
generate screen information of a second screen for receiving input of at least the reaction information and a proposal result of a target system configuration model, the target system configuration model being the identified system configuration model, to be displayed at the service terminal; and
register the reaction information and the proposal result input through the second screen displayed at the service terminal, respectively, in the reaction information and the status corresponding to the target system configuration model in the proposal candidate information.

10. The operation analysis system of claim 8, wherein the circuitry is further configured to generate screen information of a third screen for displaying at least information related to the identified system configuration model and a status indicating a proposal status of the system configuration model, to be displayed at the service terminal.

11. The operation analysis system of claim 9, wherein the circuitry is further configured to:
input at least a part of the information related to printing into a learning model; identify the system configuration model based on output from the learning model; and
cause the learning model to relearn using the reaction information input through the second screen.

12. An operation analysis method comprising:
acquiring information related to printing from a printing device;
calculating an operating rate of the printing device from the information related to printing;
determining whether the operating rate is equal to or lower than a first predetermined value;
identifying a system configuration model that improves the operating rate of the printing device that has the operating rate equal to or lower than the first predetermined value, based on a property of the printing device;
generating screen information of a presentation screen for presenting the system configuration model;
acquiring job type information from the information related to printing;
determining whether printing capability of the printing device that has the operating rate equal to or lower than the first predetermined value satisfies a predetermined condition based on the job type information;
identifying the system configuration model corresponding to the property and the printing capability of the printing device that satisfies the predetermined condition; and
determining, as the predetermined condition, whether volume of prints using gold toner or silver toner is equal to or smaller than a second predetermined value, and whether volume of prints using special color toner other than the gold toner or silver toner is equal to or larger than a third predetermined value.

13. A non-transitory recording medium which, when executed by one or more processors on an information processing apparatus, causes the processors to perform the operation analysis method of claim 12.

14. The operation analysis method of claim 12, wherein:
the information related to printing includes information on replacement of a replacement part of the printing device; and
the operation analysis method further comprises:
acquiring a number of replacements of the replacement part from the information on replacement;
determining whether the number of replacements is equal to or larger than a second predetermined value for the printing device that has the operating rate equal to or lower than the first predetermined value; and
identifying the system configuration model for improving work efficiency of the printing device based on the property of the printing device that has the number of replacements equal to or larger than the second predetermined value.

15. The operation analysis method of claim 12, further comprising:
setting a target period of analysis according to an operation on a management device; and
calculating the operating rate within the target period, from the information related to printing.

16. The operation analysis method of claim 12, further comprising:
managing property information indicating property by model of the printing device, and
identifying the system configuration model based on the property indicated by the property information corresponding to the model of the printing device that has the operating rate equal to or lower than the first predetermined value.

17. The operation analysis method of claim 12, further comprising:
managing model management infolniation indicating a system configuration model corresponding to each property of the printing device; and
identifying, as the system configuration model for improving the operating rate of the printing device, the system configuration model according to the property of the printing device that has the operating rate equal to or lower than the first predetermined value, indicated by the model management information.

18. The operation analysis method of claim 12, further comprising:
identifying the system configuration model that improves the operating rate of the printing device and implements a predetermined printing service.

19. The operation analysis method of claim 12, wherein:
the printing device is a commercial printing device, and
the method further comprises identifying the system configuration model that improves the operating rate of the commercial printing device installed in a factory.

20. An operation analysis system comprising:
circuitry configured to:
acquire information related to printing from a printing device;
calculate an operating rate of the printing device based on the information related to printing;
determine whether the operating rate is equal to or lower than a first predetermined value;
identify a system configuration model for improving the operating rate of the printing device that has the operating rate equal to or lower than the first predetermined value, based on a property of the printing device;
generate screen information of a presentation screen for presenting the system configuration model;

manage property information indicating property by model of the printing device, and identify the system configuration model based on the property indicated by the property information corresponding to the model of the printing device that has the operating rate equal to or lower than the first predetermined value.

\* \* \* \* \*